US011469796B2

(12) United States Patent
Manolakos et al.

(10) Patent No.: US 11,469,796 B2
(45) Date of Patent: Oct. 11, 2022

(54) MAXIMUM MIMO LAYER AWARE DL POSITIONING REFERENCE SIGNAL (PRS) RECEPTION

(71) Applicant: QUALCOMM Incorporated, San Diego, CA (US)

(72) Inventors: Alexandros Manolakos, San Diego, CA (US); Weimin Duan, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/996,321

(22) Filed: Aug. 18, 2020

(65) Prior Publication Data

US 2021/0242913 A1  Aug. 5, 2021

(30) Foreign Application Priority Data

Jan. 30, 2020 (GR) .............................. 20200100047

(51) Int. Cl.
*H04B 7/04* (2017.01)
*H04B 7/0456* (2017.01)
*H04B 7/06* (2006.01)
*H04W 72/04* (2009.01)
*H04B 7/0426* (2017.01)

(52) U.S. Cl.
CPC .......... *H04B 7/0473* (2013.01); *H04B 7/043* (2013.01); *H04B 7/0636* (2013.01); *H04W 72/042* (2013.01); *H04W 72/048* (2013.01)

(58) Field of Classification Search
CPC .... H04B 7/0473; H04B 7/043; H04B 7/0636; H04W 72/042; H04W 72/048
USPC .......................................................... 375/262
See application file for complete search history.

(56) References Cited

U.S. PATENT DOCUMENTS

| 2018/0213350 | A1* | 7/2018 | Pon ........................ G01S 5/0036 |
| 2020/0029315 | A1* | 1/2020 | Lin ......................... H04L 5/0051 |
| 2021/0037484 | A1* | 2/2021 | Zhou ..................... H04W 52/325 |
| 2021/0368468 | A1* | 11/2021 | Xing ...................... H04W 24/10 |

OTHER PUBLICATIONS

WI Rapporteur (Intel Corporation); PAN1 Agreements on NR Positioning, 3GPP Draft Ri-1913606 3rd Generation Partnership project, Mobile Competence Centere; vol. RAN WG1, Reno, US; Nov. 28, 2019, XP051831733 (Year: 2019).*

(Continued)

*Primary Examiner* — Kevin M Burd
(74) *Attorney, Agent, or Firm* — Qualcomm Incorporated

(57) ABSTRACT

A user equipment (UE) receives a maximum downlink (DL) Multiple-Input Multiple-Output (MIMO) layer configuration for DL communications, such as control signals or data signals, in one or more bandwidth parts (BWPs) and a positioning reference signal (PRS) configuration for receiving DL PRS. The UE receives DL PRS in an active BWP using a number of reception antennas based on, e.g., at least equal to, the maximum number of DL MIMO layers in the active bandwidth part. The UE may be configured to transmit uplink (UL) PRS, e.g., SRS for positioning purposes, using at least a maximum number of transmission antennas that is configured for communications purposes.

39 Claims, 14 Drawing Sheets

(56) References Cited

OTHER PUBLICATIONS

Huawei: "Report of Email Discussion", 3GPP Draft RI-1915527 3rd Generation Partnership project, Mobile Competence Centere; vol. RAN WG2. Reno, Nevada, USA, Nov. 14, 2019, XP051825272. (Year: 2019).*

Huawei, et al., "Joint TP for a Proper Reference and Enhancements of Wideband PRS", 3GPP Draft, R1-154837, 3GPP TSG RAN WG1 Meeting #82, TP for Wideband PRS, 3rd Generation Partnership Project (3GPP), Mobile Competence Centre, 650, Route Des Lucioles, F-06921 Sophia-Antipolis Cedex, France vol. RAN WG1, No. Beijing, China, Aug. 24, 2015-Aug. 28, 2015, Aug. 30, 2015 (Aug. 30, 2015), XP051021057, 6 Pages, Retrieved from the Internet: URL:http://www.3gpp.org/ftp/tsg_ran/WG1_RL1/TSGR1_82/Docs/ [retrieved on Aug. 30, 2015] Section 7.1.1. 9.

Huawei: "Report of Email Discussion [107bis#71][PowerSaving] 38.321 Running CR", 3GPP Draft, R2-1915527, 3GPP TSG RAN WG2 Meeting#108, 3rd Generation Partnership Project (3GPP), Mobile Competence Centre, 650, Route Des Lucioles, F-06921 Sophia-Antipolis Cedex, France vol. RAN WG2, No. Reno, Nevada, USA, Nov. 18, 2019-Nov. 22, 2019, Nov. 14, 2019 (Nov. 14, 2019), XP051825272, pp. 1-17, Retrieved from the Internet: URL:https://ftp.3gpp.org/tsg_ran/WG2_RL2/TSGR2_108/Docs/R2-1915527.zip [retrieved on Nov. 14, 2019] Section 6.3.

International Search Report and Written Opinion—PCT/US2020/064893—ISA/EPO—dated Mar. 25, 2021.

Qualcomm Incorporated: "Comparison of 5GC-LMF and RAN-LMC Based Positioning", 3GPP Draft, R3-195824 (Local LMF Benefits), 3GPP TSG RAN WG3 Meeting #105bis, 3rd Generation Partnership Project (3GPP), Mobile Competence Centre, 650, Route Des Lucioles, F-06921 Sophia-Antipolis Cedex, France vol. RAN WG3, No. Chongqing, China, Oct. 14, 2019-Oct. 18, 2019, Oct. 4, 2019 (Oct. 4, 2019), XP051810037, 14 Pages, Retrieved from the Internet: URL:https://ftp.3gpp.org/tsg_ran/WG3_lu/TSGR3_105bis/Docs/R3-195824.zip [retrieved on Oct. 4, 2019] Section 2.3.

Sony: "Remaining Issues on DL PRS Design for NR Positioning", 3GPP Draft, R1-1912360, 3GPP TSG RAN WG1 Meeting #99, 3rd Generation Partnership Project (3GPP), Mobile Competence Centre, 650, Route Des Lucioles, F-06921 Sophia-Antipolis Cedex, France vol. RAN WG1, No. Reno, USA, Nov. 18, 2019-Nov. 22, 2019, Nov. 9, 2019 (Nov. 9, 2019), XP051823377, 6 Pages, Retrieved from the Internet: URL:https://ftp.3gpp.org/tsg_ran/WG1_RL1/TSGR1_99/Docs/R1-1912360.zip [retrieved on Nov. 9, 2019] Proposal 5, p. 5.

WI Rapporteur (Intel Corporation): "RAN1 Agreements on NR Positioning", 3GPP Draft, R1-1913606, 3GPP TSG RAN WG1 Meeting #99, 3rd Generation Partnership Project (3GPP), Mobile Competence Centre, 650, Route Des Lucioles, F-06921 Sophia-Antipolis Cedex, France vol. RAN WG1, No. Reno, US, Nov. 18, 2019-Nov. 22, 2019, Nov. 28, 2019 (Nov. 28, 2019), XP051831733, pp. 1-47, Retrieved from the Internet: URL:https://ftp.3gpp.org/tsg_ran/WG1_RL1/TSGR1_99/Docs/R1-1913606.zip [retrieved on Nov. 28, 2019] p. 4/47.

* cited by examiner

MAXIMUM MIMO LAYER AWARE DL POSITIONING REFERENCE SIGNAL (PRS) RECEPTION

CROSS-REFERENCE TO RELATED APPLICATIONS

This application claims priority to and the benefit of Greek Patent Application No. 20200100047, entitled "MAXIMUM MIMO LAYER AWARE DL POSITIONING REFERENCE SIGNAL (PRS) RECEPTION," filed Jan. 30, 2020, which is assigned to the assignee hereof and which is expressly incorporated herein by reference in its entirety.

BACKGROUND

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

A user equipment (UE) receives a maximum downlink (DL) Multiple-Input Multiple-Output (MIMO) layer configuration for DL communications, such as control signals or data signals, in one or more bandwidth parts (BWPs) and a positioning reference signal (PRS) configuration for receiving DL PRS. The UE receives DL PRS in an active BWP using a number of reception antennas based on, e.g., at least equal to, the maximum number of DL MIMO layers in the active bandwidth part. The UE may be configured to transmit uplink (UL) PRS, e.g., SRS for positioning purposes, using at least a maximum number of transmission antennas that is configured for communications purposes.

In one implementation, a method for positioning of a user equipment (UE) performed by the UE, includes receiving a positioning reference signal (PRS) configuration for receiving PRS; receiving an indication of a maximum number of downlink (DL) Multiple-Input Multiple-Output (MIMO) layers that will be used to transmit communication signals comprising control signals or data signals to the UE in each bandwidth part (BWP) in one or more bandwidth parts, wherein each bandwidth part comprises a set of frequency resources of a component carrier of a radio frequency (RF) spectrum band; and receiving a PRS in an active bandwidth part using a number of antennas based on the maximum number of DL MIMO layers in the active bandwidth part.

In one implementation, a user equipment (UE) configured for positioning, includes a wireless transceiver configured for sending and receiving messages; at least one memory; and at least one processor coupled to the wireless transceiver and the at least one memory, the at least one processor configured to: receive, via the wireless transceiver, a positioning reference signal (PRS) configuration for receiving PRS; receive, via the wireless transceiver, an indication of a maximum number of downlink (DL) Multiple-Input Multiple-Output (MIMO) layers that will be used to transmit communication signals comprising control signals or data signals to the UE in each bandwidth part (BWP) in one or more bandwidth parts, wherein each bandwidth part comprises a set of frequency resources of a component carrier of a radio frequency (RF) spectrum band; and receive, via the wireless transceiver, a PRS in an active bandwidth part using a number of antennas based on the maximum number of DL MIMO layers in the active bandwidth part.

In one implementation, a user equipment (UE) configured for positioning, includes means for receiving a positioning reference signal (PRS) configuration for receiving PRS; means for receiving an indication of a maximum number of downlink (DL) Multiple-Input Multiple-Output (MIMO) layers that will be used to transmit communication signals comprising control signals or data signals to the UE in each bandwidth part (BWP) in one or more bandwidth parts, wherein each bandwidth part comprises a set of frequency resources of a component carrier of a radio frequency (RF) spectrum band; and means for receiving a PRS in an active bandwidth part using a number of antennas based on the maximum number of DL MIMO layers in the active bandwidth part.

In one implementation, a non-transitory computer readable storage medium including program code stored thereon, the program code is operable to configure at least one processor in a user equipment (UE) configured for positioning, includes program code to receive a positioning reference signal (PRS) configuration for receiving PRS; program code to receive an indication of a maximum number of downlink (DL) Multiple-Input Multiple-Output (MIMO) layers that will be used to transmit communication signals comprising control signals or data signals to the UE in each bandwidth part (BWP) in one or more bandwidth parts, wherein each bandwidth part comprises a set of frequency resources of a component carrier of a radio frequency (RF) spectrum band; and program code to receive a PRS in an active bandwidth part using a number of antennas based on the maximum number of DL MIMO layers in the active bandwidth part.

In one implementation, a method for positioning of a user equipment (UE) performed by a serving base station for the UE, includes configuring the UE with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof; and configuring the UE with the number N antenna ports within one SRS resource for positioning, or the number N of SRS resources for positioning with one antenna port each.

In one implementation, a base station serving a user equipment (UE) configured for positioning, includes a wireless transceiver for wirelessly receiving and sending messages with UEs; a communication interface for receiving and sending messages to entities within a wireless network; at least one memory; and at least one processor coupled to the wireless transceiver, the communication interface, and the at least one memory, the at least one processor configured to: configuring the UE with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof; and configuring the UE with the number N antenna ports within one SRS resource for positioning, or the number N of SRS resources for positioning with one antenna port each.

In one implementation, a base station serving a user equipment (UE) configured for positioning, includes means for configuring the UE with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof; and means for configuring the UE with the number N antenna ports within one SRS resource for positioning, or the number N of SRS resources for positioning with one antenna port each.

In one implementation, a non-transitory computer readable storage medium including program code stored thereon, the program code is operable to configure at least one processor in a base station serving a user equipment (UE) configured for positioning, includes program code to configure the UE with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof; and program code to configure the UE with the number N antenna ports within one SRS resource for positioning, or the number N of SRS resources for positioning with one antenna port each.

In one implementation, a method for positioning of a user equipment (UE) performed by the UE, includes receiving a first configuration from a serving base station with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof; receiving a second configuration from the serving base station with the number N antenna ports within one SRS resource for positioning, or the number N of SRS resources for positioning with one antenna port each; and transmitting SRS for positioning with at least the number N of antennas.

In one implementation, a user equipment (UE) configured for positioning, includes a wireless transceiver configured for sending and receiving messages; at least one memory; and at least one processor coupled to the wireless transceiver and the at least one memory, the at least one processor configured to: receive a first configuration from a serving base station with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof; receive a second configuration from the serving base station with the number N antenna ports within one SRS resource for positioning, or the number N of SRS resources for positioning with one antenna port each; and transmit SRS for positioning with at least the number N of antennas.

In one implementation, a user equipment (UE) configured for positioning, includes means for receiving a first configuration from a serving base station with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof; means for receiving a second configuration from the serving base station with the number N antenna ports within one SRS resource for positioning, or the number N of SRS resources for positioning with one antenna port each; and means for transmitting SRS for positioning with at least the number N of antennas.

In one implementation, a non-transitory computer readable storage medium including program code stored thereon, the program code is operable to configure at least one processor in a base station serving a user equipment (UE) configured for positioning, includes program code to receive a first configuration from a serving base station with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof; program code to receive a second configuration from the serving base station with the number N antenna ports within one SRS resource for positioning, or the number N of SRS resources for positioning with one antenna port each; and program code to transmit SRS for positioning with at least the number N of antennas.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
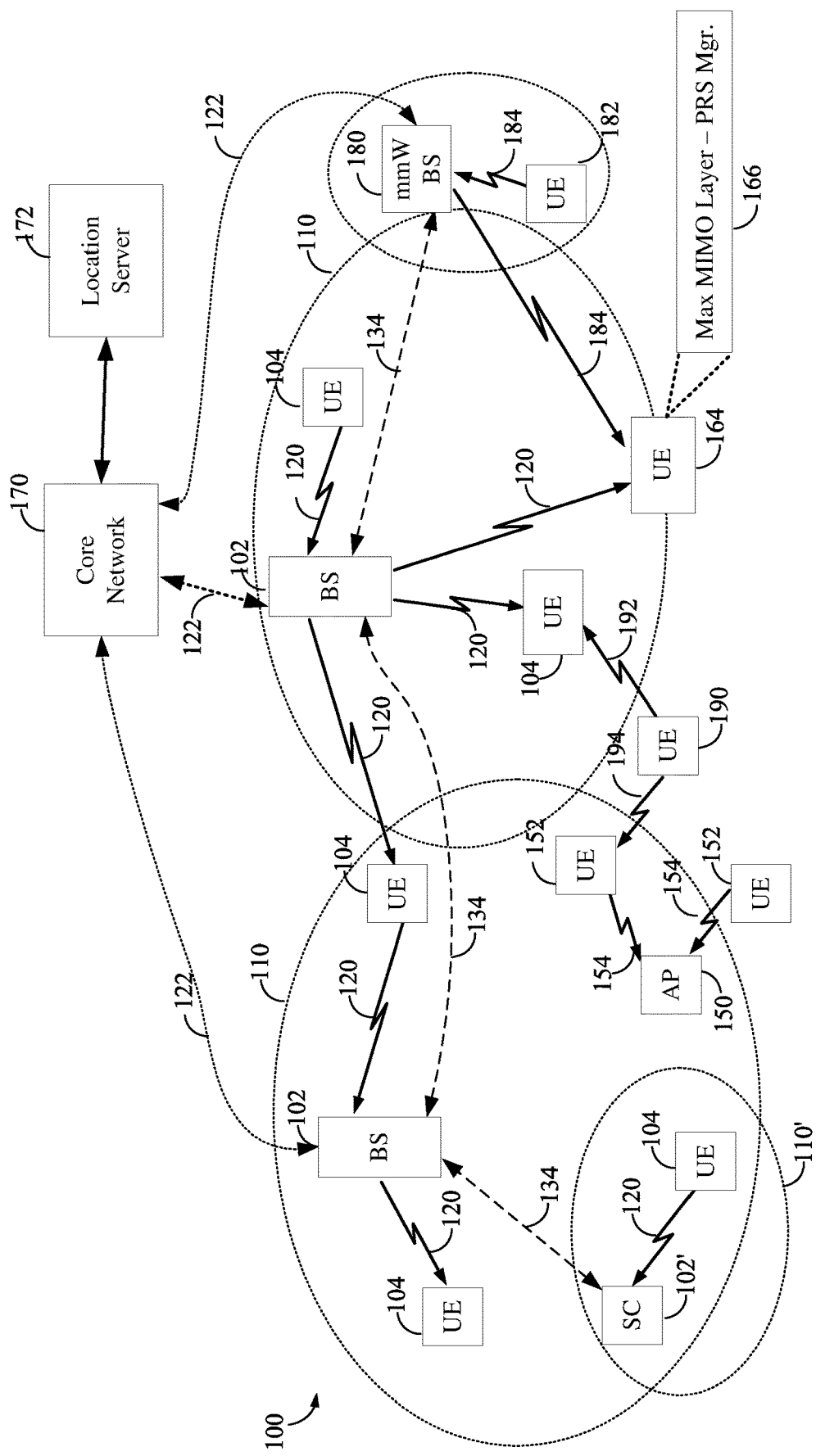
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164. In an aspect, the UE 164 may include a Max MIMO Layer—PRS manager 166 that may enable the UE 164 to perform the UE operations described herein. Note that although only one UE in FIG. 1 is illustrated as having a Max MIMO Layer—PRS-interaction manager 166, any of the UEs in FIG. 1 may be configured to perform the UE operations described herein.

Figure 2A:
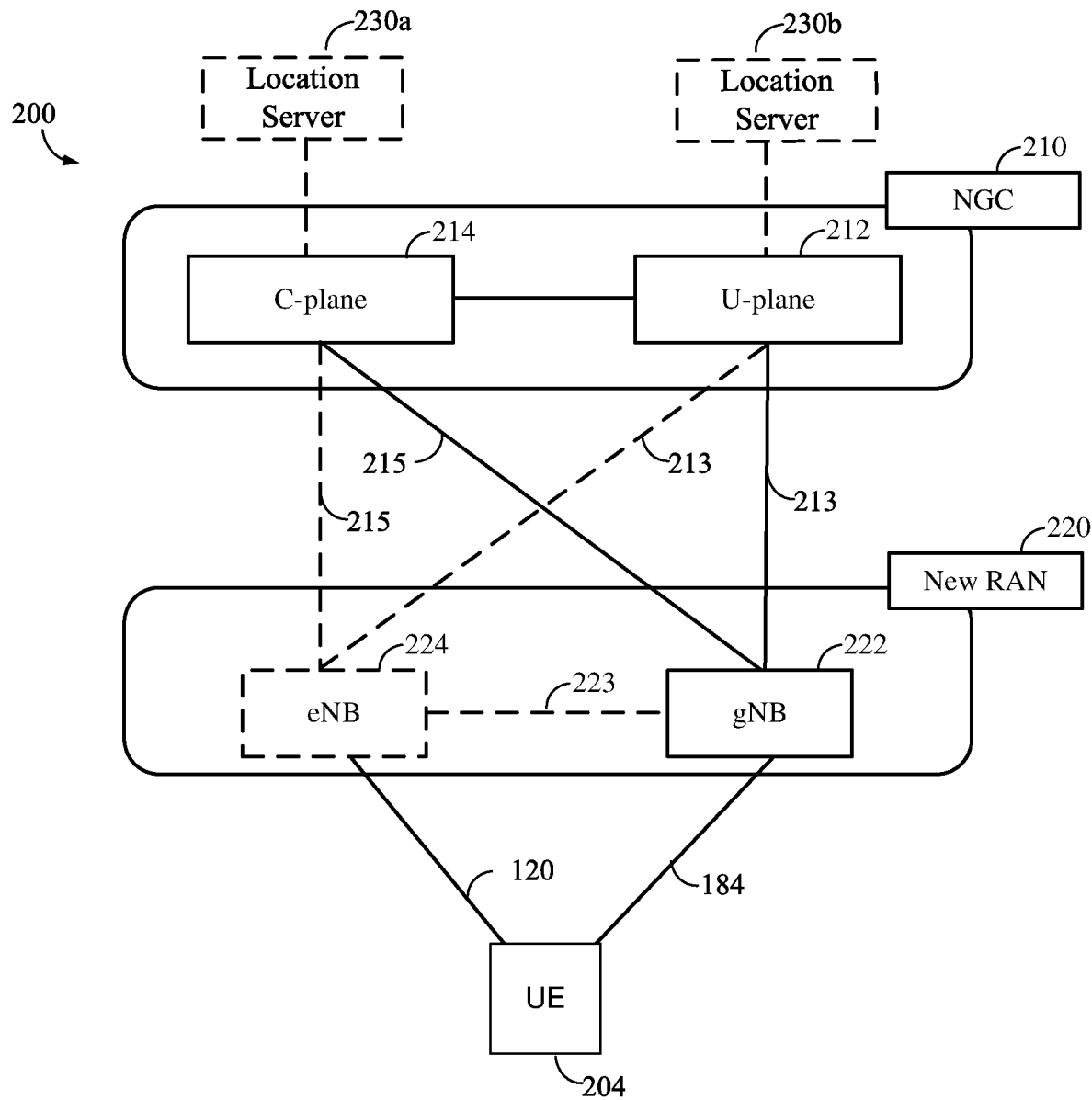
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212.

In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include one or more location servers 230*a*, 230*b* (sometimes collectively referred to as location server 230 (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
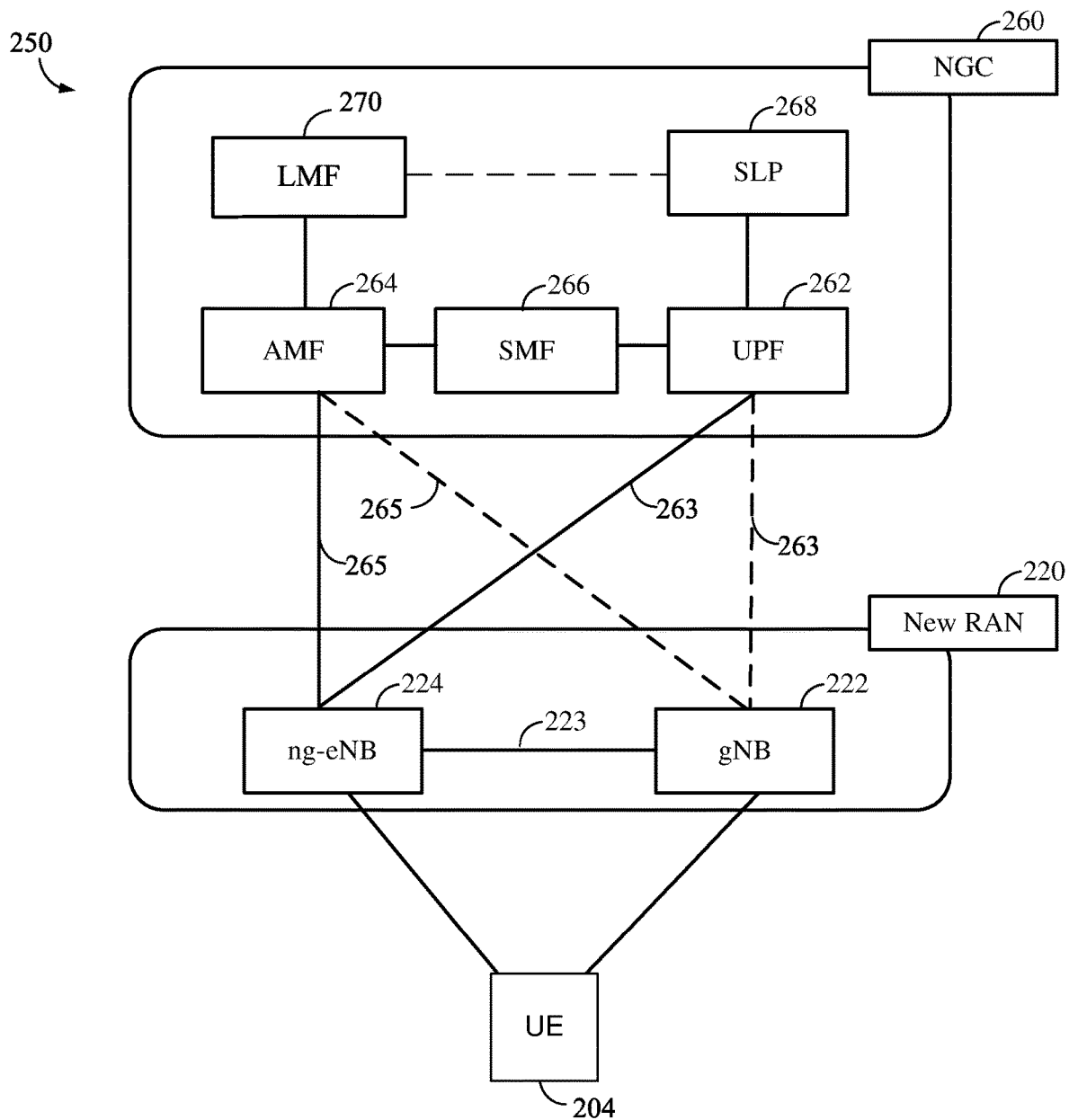

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either ng-gNB 222 or eNB 224 may communicate with UEs 204 (e.g., any of the UEs depicted in FIG. 1). The base stations of the New RAN 220 communicate with the AMF 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
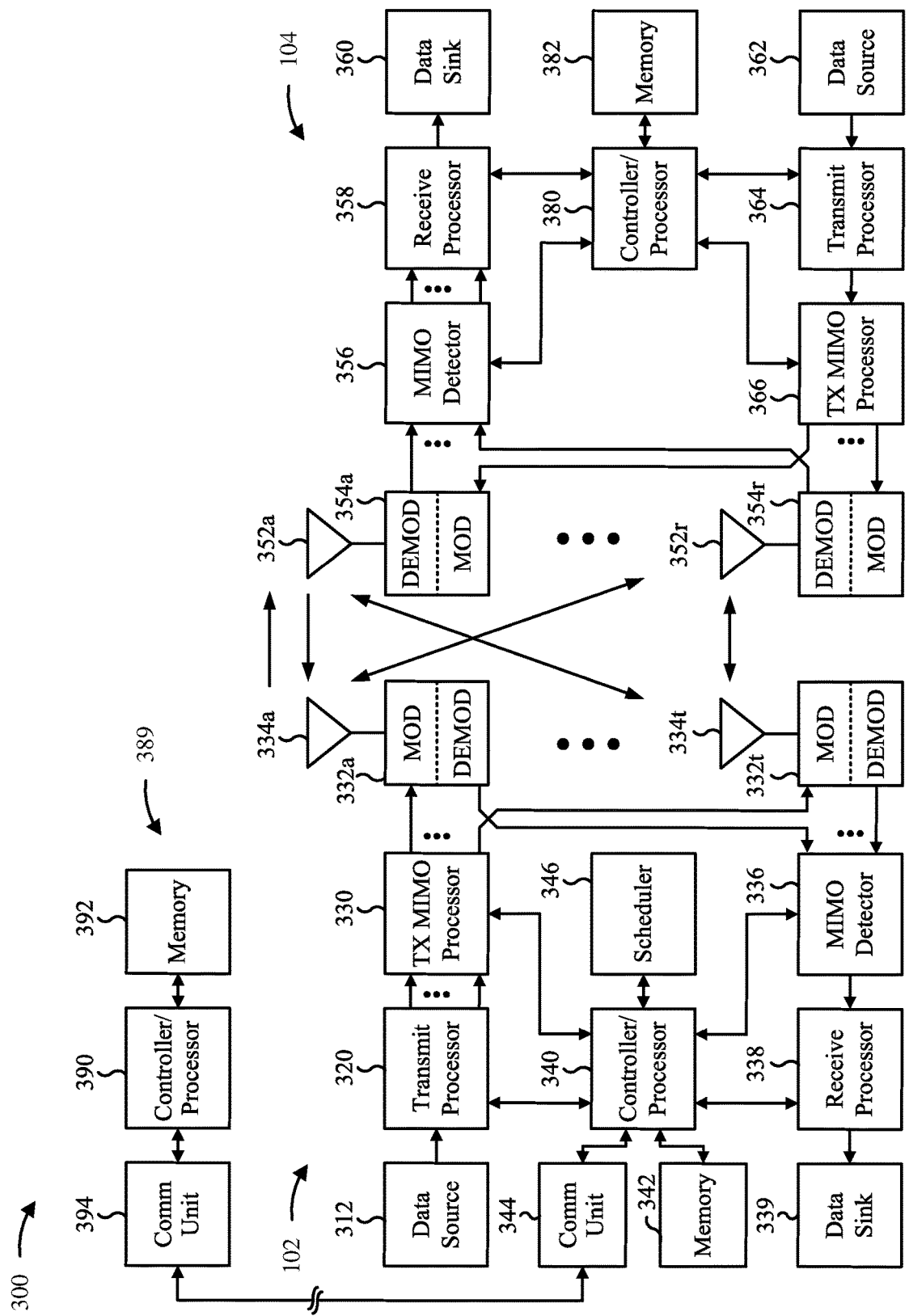
FIG. 3 illustrates a block diagram of a design of base station and UE, which may be one of the base stations and one of the UEs in FIG. 1.

FIG. 3 shows a block diagram of a design 300 of base station 102 and UE 104, which may be one of the base stations and one of the UEs in FIG. 1. Base station 102 may be equipped with T antennas 334a through 334t, and UE 104 may be equipped with R antennas 352a through 352r, where in general T≥1 and R≥1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to network controller 389 via communication unit 344. Network controller 389 may include communication unit 394, controller/processor 390, and memory 392.

Controller/processor 340 of base station 102, controller/processor 380 of UE 104, and/or any other component(s) of FIG. 3 may perform one or more techniques associated with interactions between wake-up signal (WUS) with downlink (DL) positioning reference signal (PRS) reception while the UE 104 is in a discontinuous reception (DRX) cycle, as described in more detail elsewhere herein. For example, controller/processor 340 of base station 102, controller/processor 380 of UE 104, and/or any other component(s) of FIG. 3 may perform or direct operations of, for example, process 1100 of FIG. 11, process 1200 of FIG. 12, or process 1300 of FIG. 13, and/or other processes as described herein. Memories 342 and 382 may store data and program codes for base station 102 and UE 104, respectively. In some aspects, memory 342 and/or memory 382 may comprise a non-transitory computer-readable medium storing one or more instructions for wireless communication. For example, the one or more instructions, when executed by one or more processors of the base station 102 and/or the UE 104, may perform or direct operations of, for example, process 1100 of FIG. 11, process 1200 of FIG. 12, or process 1300 of FIG. 13, and/or other processes as described herein. A scheduler 346 may schedule UEs for data transmission on the downlink and/or uplink.

As indicated above, FIG. 3 is provided as an example. Other examples may differ from what is described with regard to FIG. 3.

Figure 4:
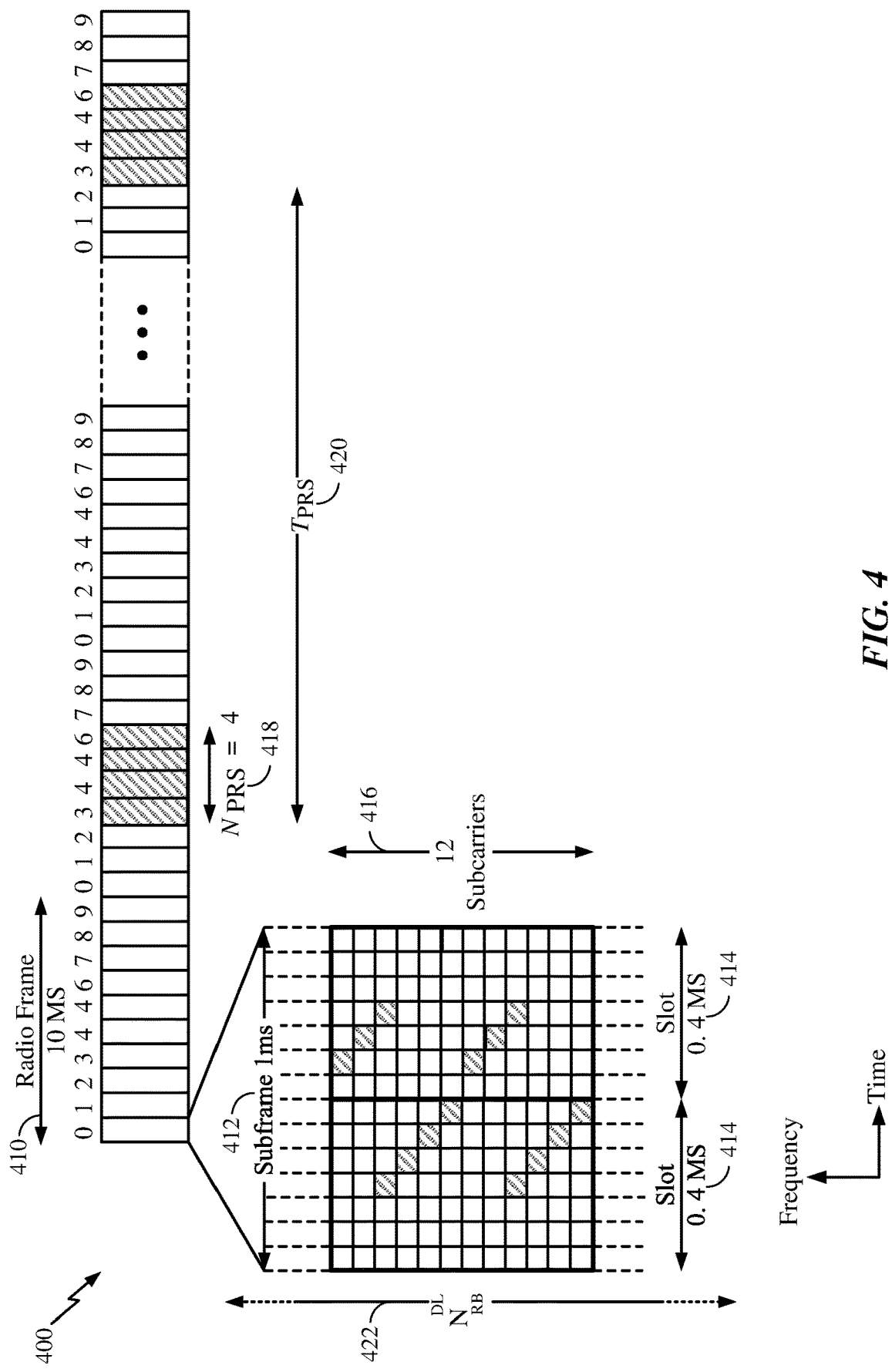
FIG. 4 is a diagram of a structure of an exemplary subframe sequence with PRS positioning occasions.

FIG. 4 shows a structure of an exemplary subframe sequence 400 with positioning reference signal (PRS) positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{RB}$ 32 12. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}$=15. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, navigation reference signals (NRS), transmitter reference signals (TRS), cell-specific reference signals (CRS), channel state information reference signals (CSI-RS), primary synchronization signals (PSS), secondary synchronization signals (SSS), etc.

Figure 5:
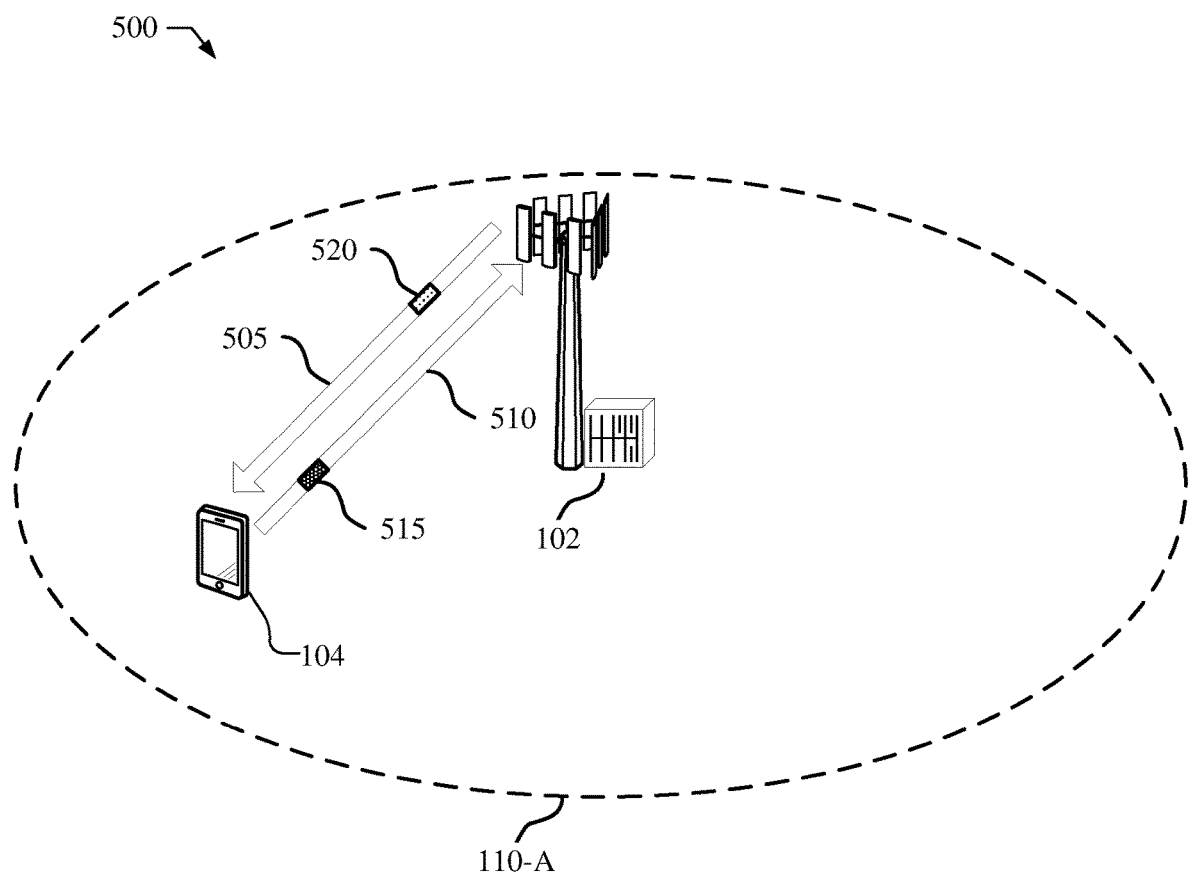
FIG. 5 illustrates an example of a wireless communications system that supports configuring a maximum number of multiple input multiple output (MIMO) layers.

FIG. 5 illustrates an example of a wireless communications system 500 that supports configuring a maximum number of multiple input multiple output (MIMO) layers. In some examples, wireless communications system 500 may implement aspects of wireless communications system 100. Wireless communications system 500 may include a base station 102 and UE 104, which may be examples of corresponding devices illustrated and described with respect to wireless communications system 100.

In some examples of wireless communications system 500, abase station 102 may serve one or more UEs 104 that are located within a geographic coverage area 110-A. Base station 102 may communicate with UE 104 via downlink 505, and UE 104 may communicate with base station 102 via uplink 510.

In some examples, UE 104 may report one or more capabilities to base station 102. For example, UE 104 may transmit capabilities report 515 to base station 102 via uplink 510. Capabilities included in a capabilities report 515 may include, for instance, an indication of a number of layers that the UE 104 can use to receive downlink transmissions (e.g., based on the number of antennas at the UE 104, antenna ports at the UE 104, processing capabilities at the UE 104, or the like). Layer mapping may be used for MIMO communications, transmit diversity, spatial multiplexing, or the like. The number of layers the UE 104 is capable of using may refer to a number of data streams the UE 104 is capable of receiving in parallel. Base station 102 may receive the reported UE capabilities from the UE 104, and may schedule subsequent communications with the UE 104 such that a transmission rank (e.g., a number of layers) does not exceed the UE capacity. A capabilities report 515 may further include an indication of a modulation and coding scheme (MCS) (e.g., a modulation scheme such as 64 quadrature amplitude modulation (QAM), 556 QAM, etc.) that the UE 104 can support. A UE 104 may have multiple capabilities within a band combination. For instance, a UE 104 may be capable of receiving downlink transmissions using four layers and 64 QAM on a first band, or may be capable of receiving downlink transmissions using two layers and 556 QAM on the first band. Similarly, the UE 104 may operate in a carrier aggregation mode. For example, in a carrier aggregation mode, UE 104 may be capable of receiving downlink 505 on a first band (e.g., a subband, a BWP, a sub-channel, or other sets or subsets of frequency resources of an operating bandwidth, such as a carrier, of the base station) using four layers and a second band using two layers may be capable of receiving downlink 505 using two layers on the first band and four layers on the second band. Transmitting a UE capabilities report 515 to the network may allow for signaling of baseband restrictions or radio frequency restrictions to the network. For example, a low cost or low power UE may benefit from receiving simplified (e.g., less complex) transmissions using a smaller number of layers, but may be capable of receiving more complicated downlink transmissions. UE capabilities reports may also providing flexibility in configuration that efficiently utilizes the hardware implementation of a UE 104 by providing the network with multiple options for operating in data connection within the same hardware envelope. For optimal benefit to the UE implementation, the network should, upon choosing the best option for data connection, indicate to the UE 104 which set of capabilities will be in operation among the multiple sets it has reported. In particular, this includes having the network signal to the UE 104 the value for an RRC parameter for the maximum number of data streams in a downlink (or uplink) transmission.

In some examples, base station 102 may receive a UE capabilities report 515 and determine UE capabilities during an initial communication (e.g., a random access channel (RACH) procedure, handover, or the like) and the network may subsequently communicate based on the initial UE capabilities report, despite the fact that the UE 104 is capable of communicating using different combinations of capabilities (e.g., capability sets). For instance, UE 104 may be capable of communicating on a first band using four layers and 64 QAM (e.g., capability set 1). The UE 104 may also be capable of communicating on the first band using two layers and 556 QAM (e.g., capability set 5). However, UE 104 may not be capable of communicating on the first band using four layers and 556 QAM. Base station 102 (or another network device) may configure UE 104 with capability set 5 (e.g., restrict operation to two layers and 556 QAM). However, in some cases, UE 104 may be capable of or prepared to communicate using four layers, based on a maximum number of MIMO layers initially configured (e.g., during a RACH procedure, a handover procedure, or the like). In such cases, despite a signal (e.g., an RRC signal) indicating the capability set 5, UE 104 may be prepared to send four layer CSI reports, four layer limited buffer rate matching (LBRM), etc.

In some cases, a semi-static signal (e.g., RRC message 520) may carry a parameter indicating a maximum number of MIMO layers the base station will use in sending transmissions on downlink 505. An RRC parameter indicating a maximum number of MIMO layers the base station 102 will use (e.g., maximum rank) may be used by UEs 104 to improve efficiency.

In some examples, UE 104 may send an explicit indication of its capability to read a maximum layer RRC parameter (e.g., maxLayer RRC parameter). For instance, a new bit may be included in the UE capabilities report 515. The new bit may indicate whether UE 104 is capable of reading a maximum layer RRC parameter. Upon receiving UE capabilities report 515 from UE 104, base station 102 may determine that UE 104 is capable of reading the maximum layer RRC parameter. Base station 102 may include the maximum layer RRC parameter in RRC message 520, and may update (e.g., semi-statically) the capabilities set for a UE based on received RRC signaling from the UE. This may allow UE 104 to avoid inefficiently continuing to use an initially configured capabilities set. It may also allow the UE to avoid inefficiently adjusting capability sets dynamically.

If UE 104 receives the maximum layer RRC parameter in RRC message 520, then UE 104 may conform to the received maximum layer RRC parameter for all communication procedures related thereto. For example, four layer LBRM procedures, channel state information (CSI) reporting, sounding reference signal (SRS) port sounding, downlink control information (DCI) field size, and the like, may all be performed in conformance with the maximum number of MIMO layers to be used by base station 102 as indicated in the maximum layer RRC parameter. That is, in some examples, base station 102 may send subsequent downlink transmissions to UE 104 based on an updated maximum number of MIMO layers based on the maximum layer RRC parameter. For instance, UE 104 may continue to receive, according to the indicated maximum number of MIMO layers, communication signals from base station 102.

Communications may also include UE 104 selecting a CSI report format based at least in part on the maximum layer RRC parameter, and transmitting a CSI report to base station 102 according to the selected CSI report format. In some examples, UE 104 may determine, based on the maximum layer RRC parameter, a sounding reference signal port sounding configuration, and may transmit sounding reference signals for communication to base station 102 according to the determined sounding reference signal port sounding configuration. In some examples, UE 104 may determine a DCI format based on the maximum number of MIMO layers, and may receive one or more DCI signals from base station 102 based on the determined DCI format.

The UE 104 may support a maximum number of DL MIMO layers per each DL bandwidth part (BWP) for communications (e.g., data and/or control signals). A BWP is a contiguous set of physical resource blocks (PRBs) on a given carrier. The resource blocks may be selected from a contiguous subset of the common resource blocks for a given numerology, which may be defined with different parameters, such as subcarrier spacing, symbol duration, and cyclic prefix (CP) length. If a maximum number of MIMO layers is configured for a BWP, the UE 104 may use this value when operating in in the BWP and ignore a cell-specific value provided in the physical downlink shared channel (PDSCH)-Serving Cell Configuration Information Element (IE). The value for the cell specific maximum MIMO layers, for example, will be equal to or greater than the value of the BWP specific maximum number of DL MIMO layers.

The maximum number of DL MIMO layers per each DL BWP extends to every DL BWP and is not limited to only an initial or default BWP. The UE 104, for example, may dynamically switch between BWPs, and will use the value of the maximum number of DL MIMO layers in the active BWP.

Figure 6:
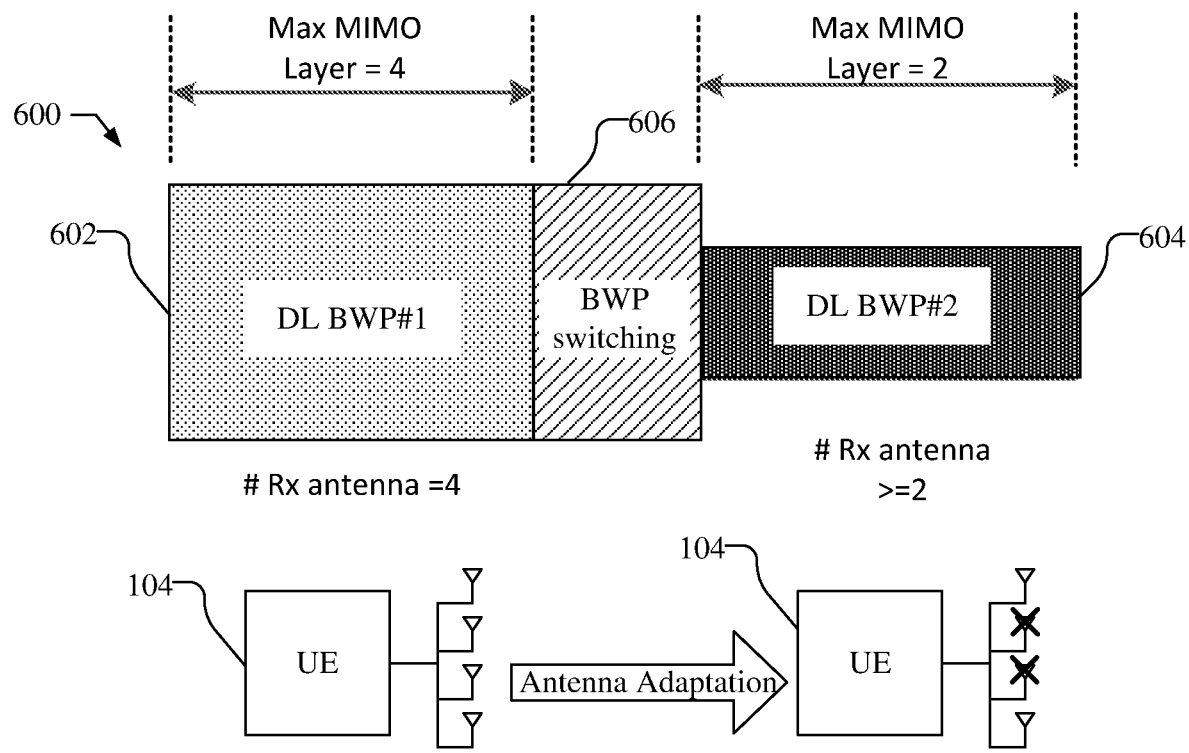
FIG. 6 illustrates an example of downlink reception by a UE and switching between downlink bandwidth parts having different maximum number of MIMO layers.

FIG. 6, for example, illustrates an example DL reception 600 by a UE 104 and switching between DL BWPs having different maximum number of MIMO layers. As illustrated, a first DL BWP 602 is configured with a maximum number of MIMO layers equal to 4, while a second DL BWP 604 is configured with a maximum number of MIMO layers equal to 2. While in the first DL BWP 602, for reception of DL communication signals (e.g., control or data signals), the UE uses a number of reception (Rx) antennas that is at least equal to the maximum number of MIMO layers, i.e., the UE 104 uses at least 4 Rx antennas while in DL BWP 602. After BWP switching 606 to the second DL BWP 604, the UE 104 uses a number of Rx antennas that is at least equal to the maximum number of MIMO layers for second DL BWP 604 for reception of DL communication signals (e.g., control or data signals), i.e., the UE 104 uses at least 2 Rx antennas while in DL BWP 604. Thus, the UE 104 may deactivate 2 Rx antennas after switching to the second DL BWP 604, thereby saving power.

Similarly, the UE 104 may support a maximum number of MIMO layers per each UL BWP for non-codebook (NCB) based UL transmissions for communications (e.g., data and/or control signals). For non-codebook-based UL transmission, the number of UL ports from which the UE 104 may transmit is determined based on indicated SRS resource indicator(s) or scheduling request indicator(s) (SRI(s)) when multiple SRS resources are configured. The SRI indication may depend on the $L_{max}$, e.g., maximum MIMO Layers in physical uplink shared channel (PUSCH)-Serving Cell Configuration IE, or if not provided, by the UE capability), and number of SRS resources, ($N_{SRS}$), in the associated SRS resource set. The configurations of the number of SRS resources ($N_{SRS}$) using NCB per each BWP, implicitly limits the maximum scheduled UL rank. As an example, if an UL BWP is configured with $N_{SRS}$=2, the maximum UL rank that can be scheduled is limited to 2.

Figure 7:
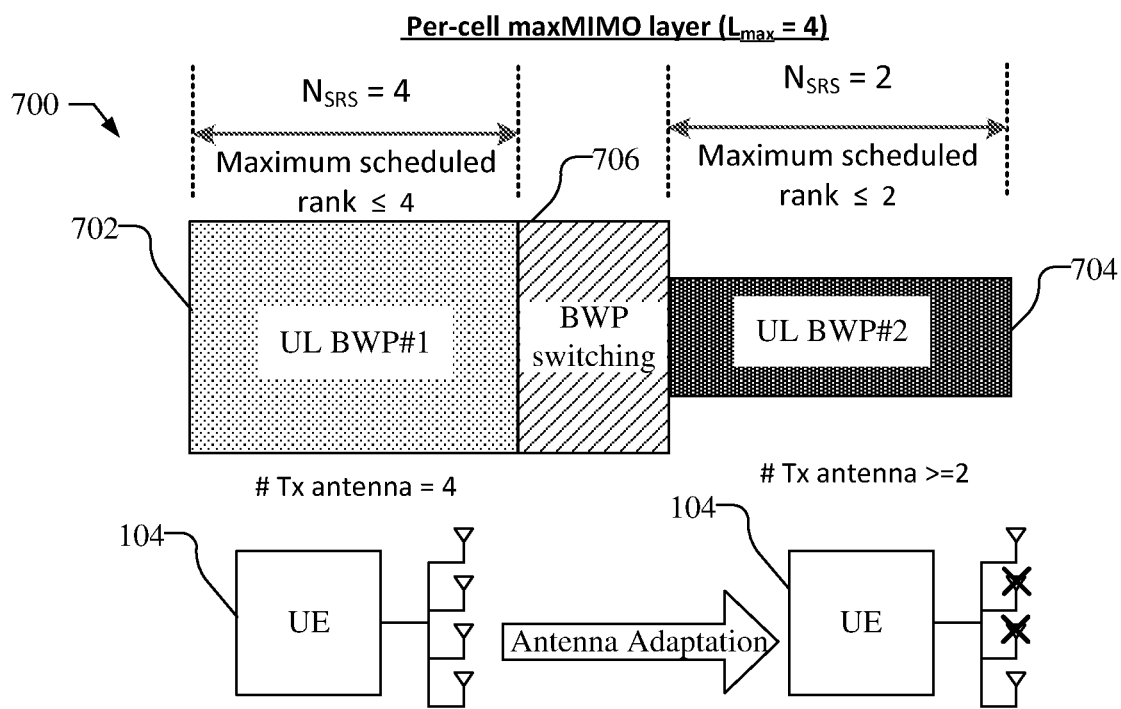
FIG. 7 illustrates an example uplink transmission by a UE and switching between uplink bandwidth parts having different SRS resources.

FIG. 7, for example, illustrates an example UL transmission 700 by a UE 104 and switching between UL BWPs having different SRS resources $N_{SRS}$. As illustrated, the per cell maximum MIMO layer ($L_{max}$) is 4, and the first UL BWP 702 is configured with a number of SRS resources ($N_{SRS}$) equal to 4, which limits the maximum scheduled UL rank to less than or equal to 4. The second UL BWP 704 is configured with a number of SRS resources ($N_{SRS}$) equal to 2, which limits the maximum scheduled UL rank to less than or equal to 2. While in the first UL BWP 702, for transmission of UL communications, the UE 104 uses a number of transmission (Tx) antennas that is at least equal to the SRS resources ($N_{SRS}$) for the first UL BWP 702, i.e., the UE 104 uses at least 4 Tx antennas while in UL BWP 702. After BWP switching 706 to the second UL BWP 704, the UE 104 uses a number of Tx antennas that is at least equal to the SRS resources ($N_{SRS}$) for the second UL BWP 704, i.e., the UE 104 uses at least 2 Tx antennas while in UL BWP 704. Thus, the UE 104 may deactivate 2 Tx antennas after switching to the second UL BWP 704, thereby saving power.

If the UE 104 switches to a second BWP with a smaller number of maximum5 MIMO layers, e.g., the second DL BWP 604 shown in FIG. 6, the UE 104 may reduce the number of active Rx antennas. For example, if the UE 104 is switching from a BWP with a maximum number of MIMO layers of 4 to a BWP with a maximum number of MIMO layers of 2, the UE 104 may keep only two Rx antennas active and may de-activate the others two antennas to save power. In this instance, for DL CSI acquisition exploiting UL/DL channel reciprocity, the UE 104 does not need to sound all four antennas, as only two antennas are enabled in Rx mode.

For a UE that supports only one capability of SRS antenna switching, the UE may send zero power at SRS ports corresponding to the de-activated antenna(s), or the UE may sound the same ports more than once. The UE may support a combination of SRS switching capabilities, such as {t1r1, t1r2}, {t1r1, t1r2, t1r4}, {t1r1, t1r2, t2r2, t2r4}, {t1r1, t2r2}, {t1r1, t2r2, t4r4}, {t1r1, t1r2, t2r2, t1r4, t2r4}, where tm represents transmission using m antennas, and rn represents reception using n antennas. The UE 104 may indicate to the network the supported combination of SRS switching capabilities, e.g., {t1r1, t1r2, t1r4}, and the network, e.g., the serving base station, may downgrade the SRS switching mode in accordance with the maximum number of MIMO layers per DL BWP, for the purpose of power savings and SRS resource overhead reduction. For example, if the UE 104 switches from a first BWP to a second BWP with a smaller number of maximum MIMO layers for communication signals, the serving base station may downgrade the SRS switching mode that corresponds to the number of maximum MIMO layers of the active BWP.

Figure 8:
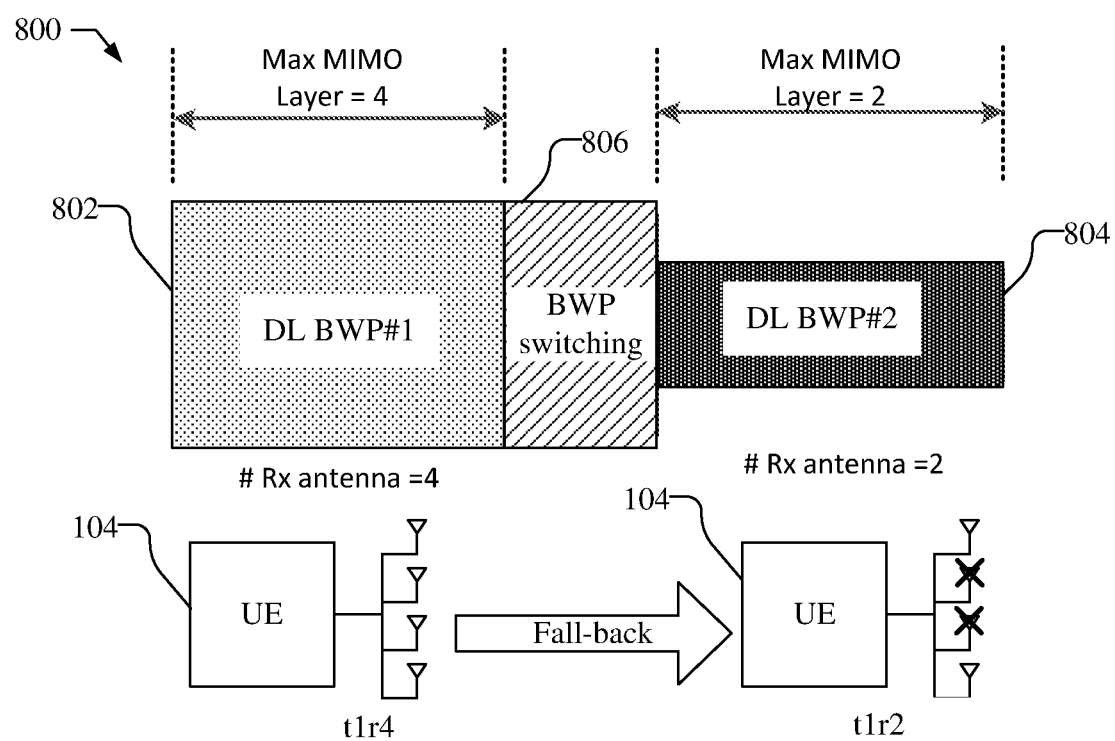
FIG. 8 illustrates another example downlink reception by a UE and switching between downlink bandwidth parts having different maximum number of MIMO layers.

FIG. 8, for example, illustrates an example DL reception 800 by a UE 104 and switching between DL BWPs having different maximum number of MIMO layers. As illustrated, a first DL BWP 802 is configured with a maximum number of MIMO layers equal to 4, while a second DL BWP 804 is configured with a maximum number of MIMO layers equal to 2. Thus, the number of Rx antennas used with the first DL BWP 802 is at least 4, and after BWP switching 806, the number of Rx antennas used with the second DL BWP 804 is at least 2. Further, the UE 104 may support a combination of SRS switching capabilities such as {t1r1, t1r2, t1r4}. Thus, while in the first DL BWP 802, the UE 104 may be configured SRS antenna switching of {t1r4}, and after BWP switching 806, the UE 104 may be configured SRS antenna switching of {t1r2}.

When processing DL PRS for positioning, if the UE 104 is not configured with a measurement gap, the UE 104 is only required to measure DL PRS within the active DL BWP and with the same numerology as the active DL BWP. The UE may measure DL PRS resources outside the active DL BWP or with a numerology different from the numerology of the active DL BWP if the measurement is made during a configured measurement gap. If the UE 104 is not provided with a measurement gap, the UE 104 is not expected to process DL PRS resources on serving or non-serving cells on any symbols indicated as UL by the serving cell. If the UE 104 is expected to measure DL PRS resources outside the active DL BWP, the UE 104 may request a measurement gap in a higher layer parameter.

Thus, as discussed above, the UE 104 may switch off a number of Rx antennas or a number of Tx antennas for communication purposes in the active BWP, e.g., to receive or transmit communication signals, e.g., control signals or data signals. The UE 104, however may be expected to receive and measure DL PRS for positioning purposes or to transmit UL PRS, e.g., SRS for positioning purposes, within the same active BWP.

In accordance with an implementation, the UE 104 receives and processes signals for positioning purposes, e.g., DL PRS, within an active BWP using a number of antennas based on the maximum number of DL MIMO layers as configured for the active BWP for communication purposes. In one implementation, the number of antennas used to receive and process DL PRS for positioning purposes may be at least equal to the maximum number of DL MIMO layers in the active bandwidth part for communication purposes. In one implementation, the number of antennas used to receive and process DL PRS for positioning purposes may be less than the maximum number of DL MIMO layers in the active bandwidth part for communication purposes Thus, if a maximum number of DL MIMO layers is configured within a BWP for communication purposes, the UE may be expected to process the DL PRS within the BWP for positioning purposes using at least the same number of antennas. Accuracy requirements may be adjusted accordingly, e.g., based on the number of Rx antennas used to receive the PRS based on the maximum DL MIMO layer configuration for DL reception.

If the UE 104 is configured with a measurement gap, e.g., to measure DL PRS resources outside the active DL BWP or with a numerology different from the numerology of the active DL BWP, the UE 104 may be expected to process the DL PRS, e.g., using a number of antennas that is based on a cell specific maximum number of MIMO layers or based on unspecified or UE implementation. In one implementation, the number of antennas may be at least equal to the cell specific maximum number of MIMO layers. The UE 104, for example, may be configured with at least the number of Rx antennas it is expected to use for DL PRS measurement when measurement gaps are configured.

If a DL PRS resource or an aggregate PRS (e.g., a collection of PRS resources or sets of PRS resources that the UE is expected to process jointly) spans across multiple active BWPs, e.g., wherein each active BWP is in a different component carrier of the RF spectrum band, the UE 104 may process the DL PRS using a number of antennas which is based on a minimum or a maximum number of antennas configured by the maximum number of DL MIMO layers in the multiple active BWPs, or using a number of antennas configured by a location server. In one implementation, the number of antennas may be at least equal to the minimum or the maximum number of antennas configured by the maximum number of DL MIMO layers in the multiple active BWPs. For example, the number of antennas may be configurable in a high layer, e.g., an LPP message from the location server. In another implementation, if the DL PRS resource or an aggregate PRS spans across multiple active BWPs, the UE 104 may not be expected to process if the maximum DL MIMO layer configurations are different for the multiple active BWPs.

In one implementation, the serving base station 102 may report the maximum MIMO layer configuration for the UE 104 to the location server, e.g., location server 172 shown in FIG. 1. For example, the base station 102 may report the maximum MIMO layer configuration to the location server after location server sends the DL PRS configuration to the base station.

In another implementation, the UE 104 may report how many antennas were used to measure the DL PRS or the maximum MIMO layer configuration to the location server, e.g., LMF 270. For example, the UE 104 may report the number of antennas or maximum MIMO layer configuration with a position measurement report with measurements of, e.g., time of arrival (TOA), reference signal time difference (RSTD), time difference of arrival (TDOA), reference signal received power (RSRP), time difference between reception and transmission of signals (Rx–Tx), etc. The report may be, e.g., include the number of antennas or the maximum MIMO configuration per PRS resource, per PRS resource set, per frequency layer, per transmission reception point (TRP), or a number of antennas used to measure all PRS resources used in generating the positioning measurement report. For example, a single number may be provided for the number of antennas used, and the location server may assume that the UE 104 used that number of antennas to measure all PRS resources used to derive the reported measurements.

In another implementation, the UE may be expected to transmit UL PRS, e.g., SRS for positioning, with at least a maximum number of Tx antennas as is configured for the communication purposes. For example, the SRS resource set for Non-Codebook-based UL communication may be configured with a number N of SRS resources, and the UE 104 may be expected to be configured with at least N antenna ports within one SRS resource for positioning. If the UE 104 is configured with X ports within one SRS resource for positioning, e.g., where X is greater than or equal to N, the UE 104 would transmit UL PRS for positioning using N antenna ports. For example, the N antenna ports used for transmitting UL PRS by the UE 104 may be the first N antenna ports in the X port configuration.

In another example, the SRS resource set for Codebook-based UL communication may be configured with SRS resources with up to a number N antenna ports, and the UE 104 may be expected to be configured with at least N antenna ports within one SRS resource for positioning. If the UE 104 is configured with X ports within one SRS resource for positioning, e.g., where X is greater than or equal to N, the UE 104 would transit UL PRS for positioning using N antenna ports. For example, the N antenna ports used for transmitting UL PRS by the UE 104 may be the first N antenna ports in the X port configuration.

In another example, the UE 104 may declare a combination of SRS switching capabilities, e.g., {t1r1, t1r2, t1r4}. The serving base station may downgrade the SRS switching mode, e.g., from t1r4 to t12r, in accordance with the maximum MIMO layers configuration per DL BWP for communications, e.g., for power savings and SRS resource overhead reduction. The UE 104 may also receive an UL PRS, e.g., SRS for positioning, configuration that satisfies the same maximum MIMO layers configuration.

Figure 9:
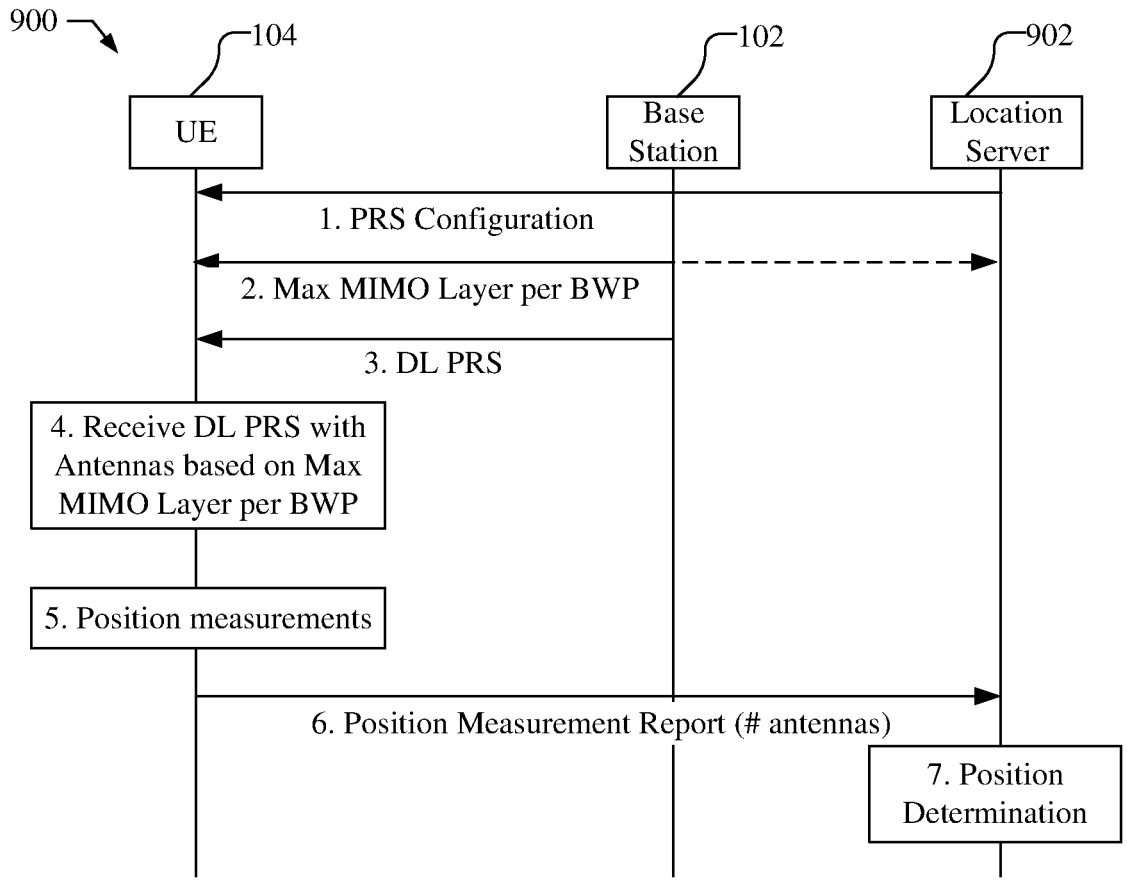
FIG. 9 is a message flow with various messages sent between components of the communication system, illustrating the reception of PRS by the UE based on the maximum MIMO layer configuration.

FIG. 9 is a message flow 900 with various messages sent between components of the communication system 100 depicted in FIG. 1, illustrating the reception of PRS by the UE 104 based on the maximum MIMO layer configuration as discussed herein. Location server 902 may be, e.g., location server 172 shown in FIG. 1, location server 230a, 230b of FIG. 2A or LMF 270 of FIG. 2B. The UE 104 may be configured to perform UE assisted positioning or UE based positioning, in which the UE itself determines its location using, for example, assistance data provided to it. In the message flow 900, it is assumed that the UE 104 and location server 902 communicate using the LPP positioning protocol referred to earlier, although use of NPP or a combination of LPP and NPP or other future protocol, such as NRPPa, is also possible. There may be one or more preliminary stages not shown, such as capabilities request and response, a request and response of assistance data, a positioning request, etc.

At stage 1, the UE 104 may receive a PRS configuration for one or more base stations, such as base station 102, from the location server 902, e.g., via LPP messaging. In some implementations, the location server 902 may configure the UE 104, in the PRS configuration message of stage 1 or with a separate message, with a number of antennas to be used to receive DL PRS if the DL PRS includes a PRS resource or aggregate PRS spanning across multiple active bandwidth parts.

At stage 2, the serving base station 102 may provide to the UE 104, e.g., via RRC messaging, a maximum MIMO layer configuration per active BWP for communications, e.g., for control signals or data signals. The base station 102 may simultaneously or shortly thereafter provide an indication of the maximum MIMO layer configuration per active BWP to the location server 902. The serving base station 102 may additionally provide the UE 104 with an indication of a cell specific maximum number of DL MIMO layers that will be used by the base station 102 to transmit communication signals, e.g., control signals or data signals.

At stage 3, the base station 102 may transmits DL PRS in an active bandwidth part. In some implementations, the DL PRS may include a PRS resource or aggregate PRS spanning across multiple active bandwidth parts.

At stage 4, the UE 104 receives the DL PRS using a number of antennas based on the maximum number of DL MIMO layers in the active bandwidth part as configured at stage 2. For example, the number of antennas may be at least equal to the maximum number of DL MIMO layers in the active bandwidth part. The UE 104 may be configured with no measurement gaps for the reception of the DL PRS. If measurement gaps are configured for the DL PRS or for a subsequent DL PRS, the UE 104 may receive the DL PRS using a number of antennas based on, e.g., at least equal to, the cell specific maximum number of DL MIMO layers, e.g., as configured in stage 2. If the DL PRS includes a PRS resource or aggregate PRS spanning across multiple active bandwidth parts, the UE 104 may receive the DL PRS using a minimum number or a maximum number of antennas configured by the maximum number of DL MIMO layers in the multiple active bandwidth parts, e.g., as configured in stage 2, or using a number of antennas configured by a location server, e.g., at stage 1. In another implementation, if the DL PRS includes a PRS resource or aggregate PRS spanning across multiple active bandwidth parts that have different maximum DL MIMO layer configurations, the UE 104 may not receive the DL PRS.

At stage 5, the UE 104 may perform position measurements using the received DL PRS. For example, using the DL PRS from stage 3, and in some implementations using additional PRS from other base stations (not shown) or UL PRS transmitted by the UE 104, the UE 104 may perform positioning methods such as TOA, RSTD, TDOA, RSRP, Rx-Tx, etc. In UE based positioning methods, the UE may further determine a position estimate using the position measurements, e.g., using positions of base stations, which may be provided in an assistance data message (not shown). In some implementations, the accuracy requirement is adjusted for the PRS measurement based on the number of antennas used to receive the PRS.

At stage 6, the UE 104 may transmit a position measurement report to the location server 902, e.g., using LPP messaging. The position measurement report may provide the position measurements and/or position estimate, if determined, from stage 5. The UE 104 may include in the position measurement report an indication number of antennas used to receive the DL PRS or the maximum number of DL MIMO layers configured at stage 2. The number of antennas used to receive the DL PRS or the maximum number of DL MIMO layers reported to the location server may include a number of antennas or a maximum number of DL MIMO layers per PRS resource, per PRS resource set, per frequency layer, per transmission reception point (TRP), or a number of antennas used to measure all PRS resources used in generating the positioning measurement report.

At stage 7, the location server 902 may determine the UE location based on any PRS based positioning measurements received at stage 6, or may verify the UE location received at stage 6.

Figure 10:
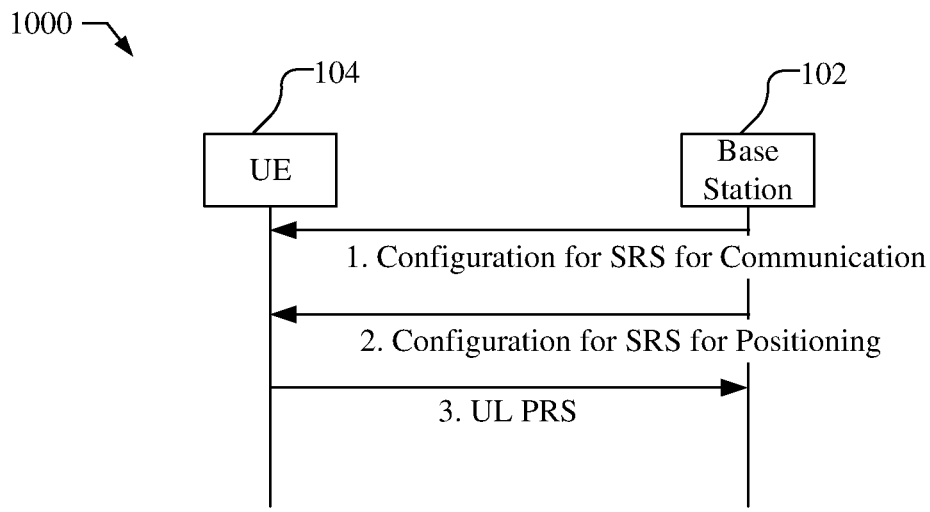
FIG. 10 is a message flow with various messages sent between components of the communication system, illustrating the transmission of SRS for positioning by the UE based the configuration for SRS for communications.

FIG. 10 is a message flow 1000 with various messages sent between components of the communication system 100 depicted in FIG. 1, illustrating the transmission of UL PRS, SRS for positioning, by the UE 104 based the configuration for SRS for communications as discussed herein. There may be one or more preliminary stages not shown, such as capabilities request and response, a request and response of assistance data, a positioning request, etc.

At stage 1, the serving base station 102 may provide to the UE 104, e.g., via RRC messaging, a configuration for SRS for communications, e.g., control signals or data signals. For example, the UE 104 may be configured with a number N of sounding reference signal (SRS) resources for UL communication, each SRS resource having one antenna port; or SRS resources for UL communication with up to the number N of antenna ports in each SRS resource; or an SRS for DL CSI acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof. For example, the UE may be configured for communication based on a maximum number of UL MIMO layers for communication in each BWP in one or more BWPs.

At stage 2, the serving base station 102 may provide to the UE 104, e.g., via RRC messaging, a configuration for SRS for positioning. For example, the UE 104 may be configured with the number N antenna ports within one SRS resource for positioning or the number N of SRS resources for positioning with one antenna port each. For example, the UE 104 may be configured with SRS resource for positioning based on the UL MIMO layer configuration from stage 1.

At stage 3, the UE 104 may transmit UL PRS, e.g., the SRS, using at least the number of antennas as configured for communication purposes at stage 1. For example, the UE 104 may be configured with X ports within one SRS resource for positioning, and the UE may transmit the SRS resource with N antenna ports, wherein N is less than X.

Figure 11:
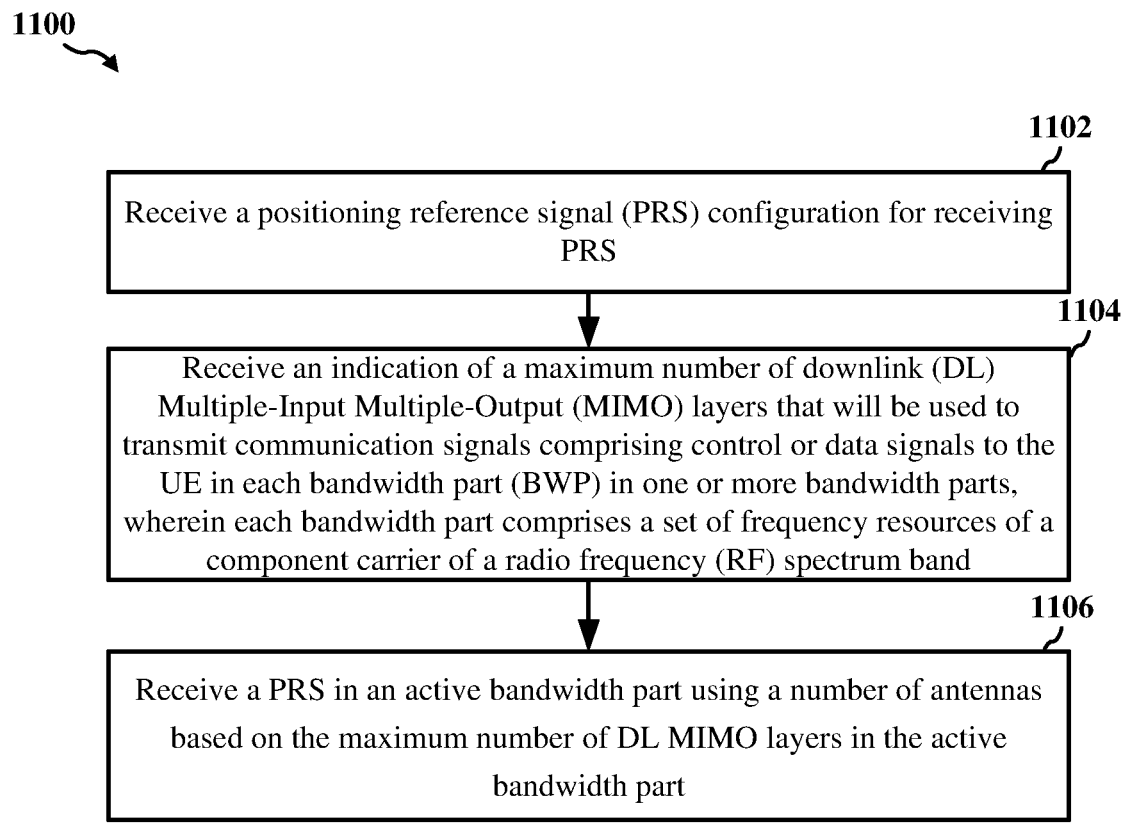
FIG. 11 shows a flowchart for an exemplary method for positioning of a UE performed by the UE.

FIG. 11 shows a flowchart for an exemplary method 1100 for positioning of a user equipment (UE) performed by the UE, in a manner consistent with disclosed implementation.

At block 1102, the UE receives a positioning reference signal (PRS) configuration for receiving PRS, e.g., as discussed at stage 1 of FIG. 9. At block 1104, the UE receives an indication of a maximum number of downlink (DL) Multiple-Input Multiple-Output (MIMO) layers that will be used to transmit communication signals comprising control or data signals to the UE in each bandwidth part (BWP) in one or more bandwidth parts, wherein each bandwidth part comprises a set of frequency resources of a component carrier of a radio frequency (RF) spectrum band, e.g., as discussed at stage 2 of FIG. 9. At block 1106, the UE receives a PRS in an active bandwidth part using a number of antennas based on the maximum number of DL MIMO layers in the active bandwidth part, e.g., as discussed at stage 3 and 4 of FIG. 9.

In one implementation, the number of antennas based on the maximum number of DL MIMO layers in the active bandwidth part may be the number of antennas at least equal to the maximum number of DL MIMO layers in the active bandwidth part.

In one implementation, the accuracy requirement for a PRS measurement is adjusted based on the number of antennas based on the maximum number of DL MIMO layers in the active bandwidth part and used to receive the PRS, e.g., as discussed at stage 5 of FIG. 9.

In one implementation, no measurement gaps are configured for the PRS received in the active bandwidth part; and wherein when measurement gaps are configured for receiving a second PRS, the UE receives an indication of a cell specific maximum number of DL MIMO layers that will be used by the base station to transmit the communication signals to the UE, and receives the second PRS using a second number of antennas based on the cell specific maximum number of DL MIMO layers, e.g., as discussed at stages 2, 3, and 4 of FIG. 9.

In one implementation, the PRS comprises a PRS resource or an aggregate PRS spanning across multiple active bandwidth parts, and receiving the PRS in the active bandwidth part using the number of antennas based on the maximum number of DL MIMO layers in the active bandwidth part comprises receiving the PRS resource or the aggregate PRS spanning across multiple active bandwidth parts using the number of antennas which is based on one of a minimum or a maximum number of antennas configured by the maximum number of DL MIMO layers in the multiple active bandwidth parts or using the number of antennas configured by a location server, e.g., as discussed at stages 1, 2, 3, and 4 of FIG. 9. For example, the aggregate PRS spanning across multiple active bandwidth parts may be a collection of PRS resources or sets of PRS resources that the UE is expected to process jointly. Further each active bandwidth part may be in a different component carrier of the RF spectrum band.

In one implementation, the PRS comprises a PRS resource or an aggregate PRS spanning across multiple active bandwidth parts, wherein each of the multiple active bandwidth parts has a same maximum number of DL MIMO layers, and wherein the PRS resource or the aggregate PRS spanning across multiple active bandwidth parts having different maximum number of DL MIMO layers is not received.

In one implementation, the PRS configuration is received from a location server and the indication of the maximum number of DL MIMO layers is received from a serving base station, e.g., as discussed at stages 1 and 2 of FIG. 9. The serving base station may report to the location server the indication of the maximum number of DL MIMO layers of the UE, e.g., as discussed at stage 2 of FIG. 9. The UE may transmit to the location server a report with the number of antennas used to receive the PRS or the maximum number of DL MIMO layers configured to the UE, e.g., as discussed at stage 6 of FIG. 9. The report of the number of antennas used to receive the PRS or the maximum number of DL MIMO layers configured to the UE may be included in a positioning measurement report transmitted to the location server, e.g., as discussed at stage 6 of FIG. 9. Further, the number of antennas used to receive the PRS or the maximum number of DL MIMO layers reported to the location server may be one of the number of antennas or the maximum number of DL MIMO layers per PRS resource, per PRS resource set, per frequency layer, per transmission reception point (TRP), or the number of antennas used to measure all PRS resources used in generating the positioning measurement report, e.g., as discussed at stage 6 of FIG. 9.

Figure 12:
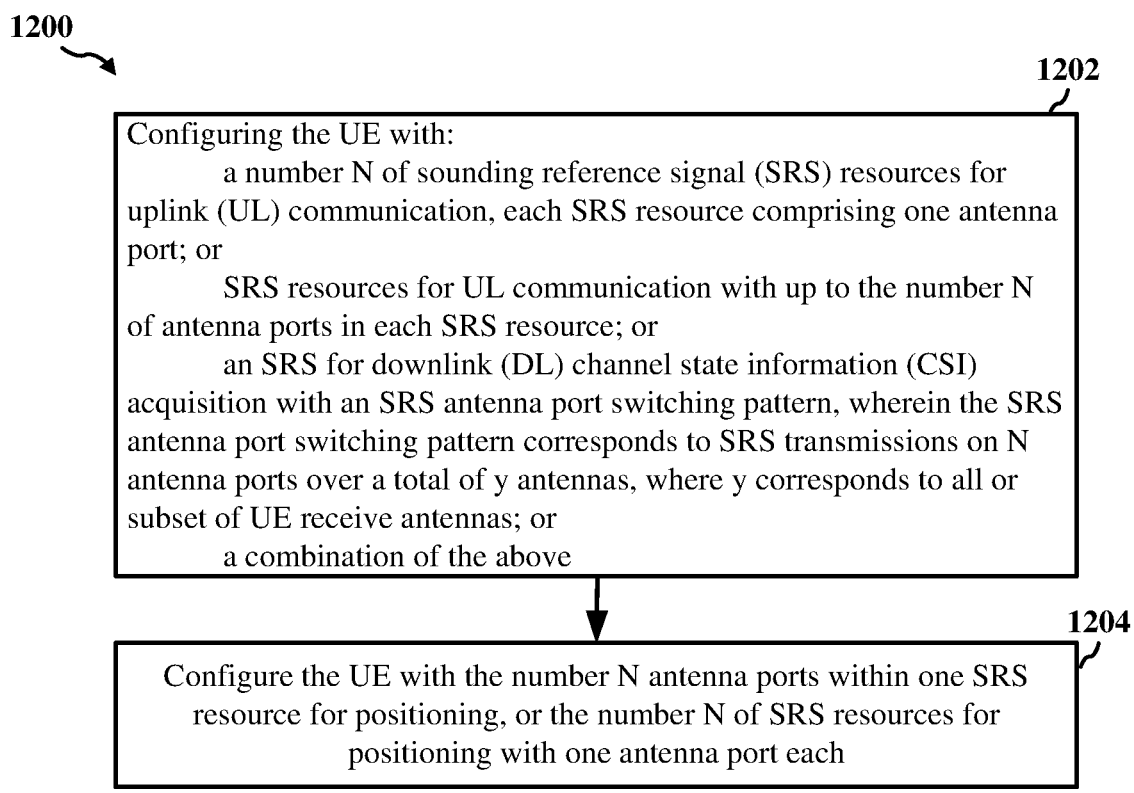
FIG. 12 shows a flowchart for an exemplary method for positioning of a UE performed by a serving base station.

FIG. 12 shows a flowchart for an exemplary method 1200 for positioning of a user equipment (UE) performed by a serving base station for the UE, in a manner consistent with disclosed implementation.

At block 1202, the base station configures the UE with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof, e.g., as discussed at stage 1 of FIG. 10. At block 1204, the base station configures the UE with the number N antenna ports within one SRS resource for positioning, or the number N of SRS resources for positioning with one antenna port each, as discussed at stage 2 of FIG. 10.

In one implementation, the UE is configured for communication based on a maximum number of UL Multiple-Input Multiple-Output (MIMO) layers for communication in each bandwidth part in one or more bandwidth parts, wherein each bandwidth part comprises a set of frequency resources of a component carrier of a radio frequency (RF) spectrum band, and the UE is configured with the number N antenna ports within one SRS resource for positioning, or the number N of SRS resources for positioning based on the UL MIMO layers, e.g., as discussed at stages 1 and 2 of FIG. 10.

In one implementation, the UE is configured with X antenna ports within one SRS resource for positioning, and the UE transmits the SRS resource with N antenna ports, wherein N is less than X, e.g., as discussed at stages 2 and 3 of FIG. 10.

Figure 13:
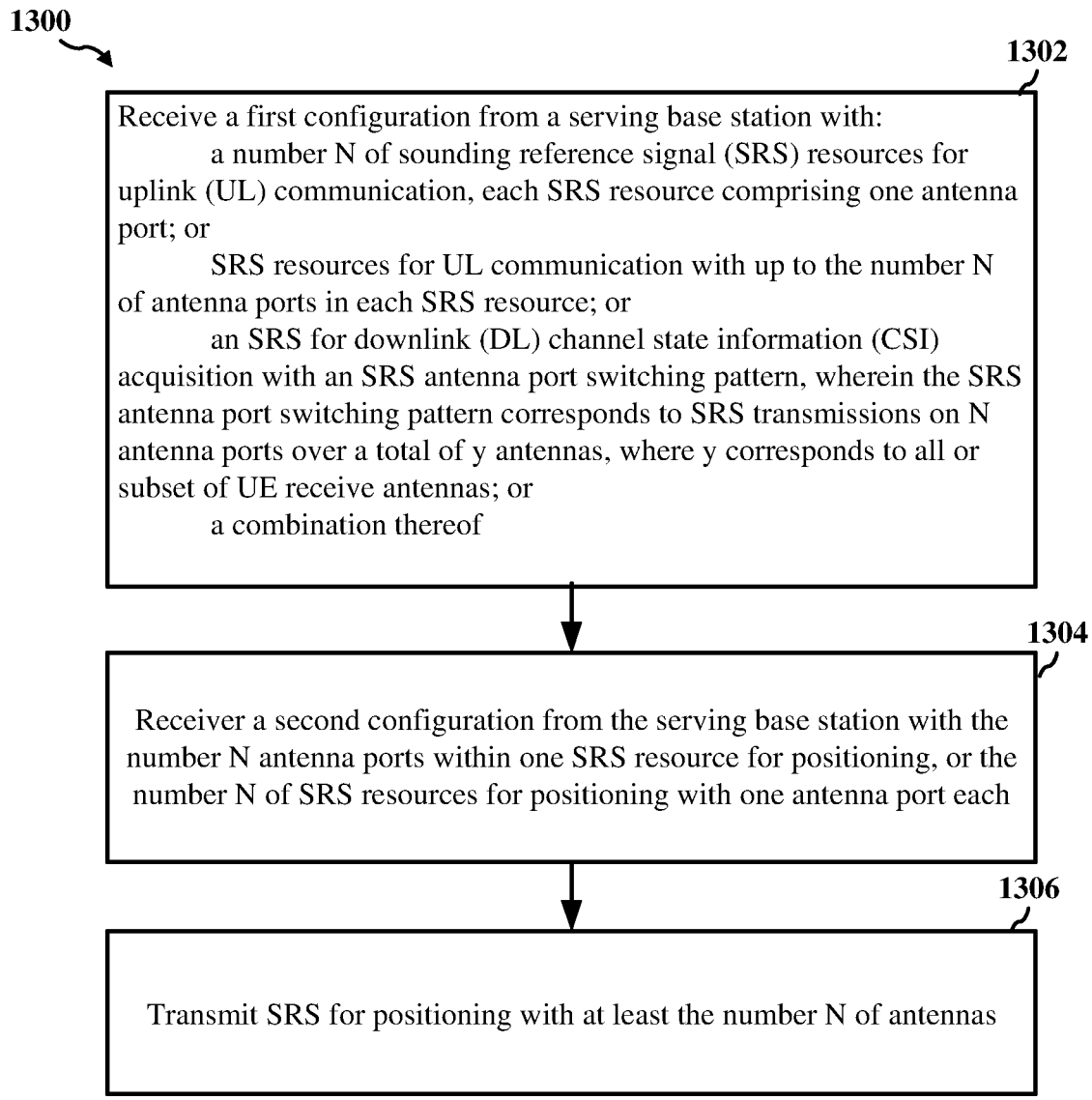
FIG. 13 shows a flowchart for an exemplary method for positioning of a UE performed by the UE.

FIG. 13 shows a flowchart for an exemplary method 1300 for positioning of a user equipment (UE) performed by the UE, in a manner consistent with disclosed implementation.

At block 1302, the UE receives a first configuration from a serving base station with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof, e.g., as discussed at stage 1 of FIG. 10. At block 1304, the UE receives a second configuration from the serving base station with the number N antenna ports within one SRS resource for positioning, or the number N of SRS resources for positioning with one antenna port each, e.g., as discussed at stage 2 of FIG. 10. At block 1306, the UE transmits SRS for positioning with at least the number N of antennas, as discussed at stage 3 of FIG. 10.

In one implementation, the UE is configured for communication based on a maximum number of UL Multiple-Input Multiple-Output (MIMO) layers for communication in each bandwidth part in one or more bandwidth parts, wherein each bandwidth part comprises a set of frequency resources of a component carrier of a radio frequency (RF) spectrum band, and the UE is configured with the number N antenna ports within one SRS resource for positioning, or the number N of SRS resources for positioning based on the UL MIMO layers, e.g., as discussed at stages 1 and 2 of FIG. 10.

In one implementation, the UE is configured with X antenna ports within one SRS resource for positioning, and the UE transmits the SRS resource with N antenna ports, wherein N is less than X, e.g., as discussed at stages 2 and 3 of FIG. 10.

Figure 14:
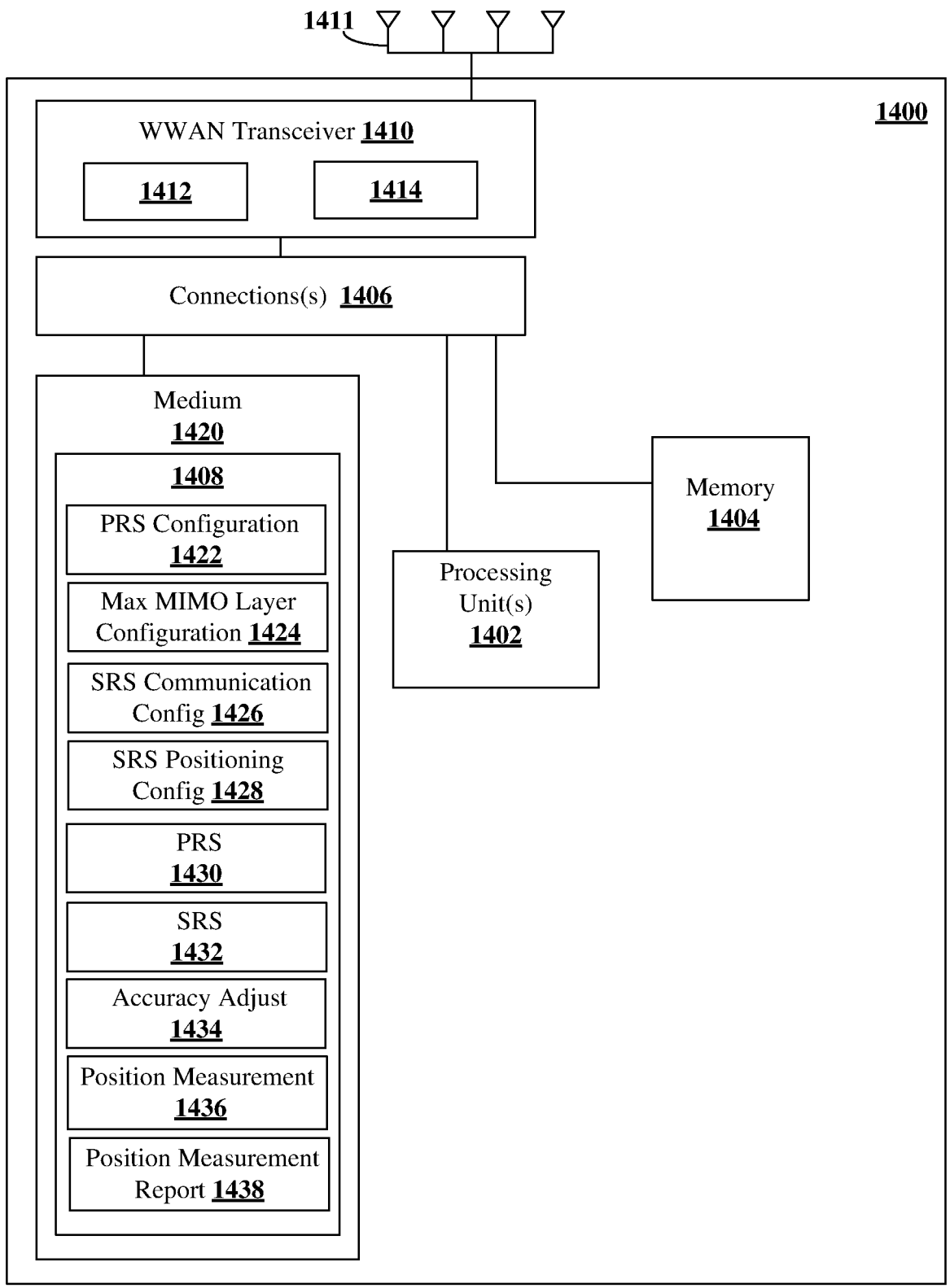
FIG. 14 shows a schematic block diagram illustrating certain exemplary features of a UE enabled to support positioning using the reception of PRS based on the maximum MIMO layer configuration or transmission of SRS for positioning based on the configuration for SRS for communications.

FIG. 14 shows a schematic block diagram illustrating certain exemplary features of a UE 1400, e.g., such as UE 104 shown in FIG. 1, enabled to support positioning of the UE using the reception of PRS based on the maximum MIMO layer configuration or transmission of SRS for positioning based on the configuration for SRS for communications, as described herein. UE 1400 may, for example, include one or more processors 1402, memory 1404, an external interface such as a transceiver 1410 (e.g., wireless network interface), which may be operatively coupled with one or more connections 1406 (e.g., buses, lines, fibers, links, etc.) to non-transitory computer readable medium 1420 and memory 1404. The UE 1400 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 1400 may take the form of a chipset, and/or the like. Transceiver 1410 may, for example, include a transmitter 1412 enabled to transmit one or more signals over one or more types of wireless communication networks and a receiver 1414 to receive one or more signals transmitted over the one or more types of wireless communication networks.

In some embodiments, UE 1400 may include an antenna array 1411, which may be internal or external. UE antenna array 1411 may be used to transmit and/or receive signals processed by transceiver 1410. In some embodiments, UE antenna array 1411 may be coupled to transceiver 1410. In some embodiments, measurements of signals received (transmitted) by UE 1400 may be performed at the point of connection of the UE antenna array 1411 and transceiver 1410. For example, the measurement point of reference for received (transmitted) RF signal measurements may be an input (output) terminal of the receiver 1414 (transmitter 1412) and an output (input) terminal of the UE antenna array 1411. With the antenna array 1411, the antenna connector may be viewed as a virtual point representing the aggregate output (input) of multiple UE antennas. In some embodiments, UE 1400 may measure received signals including signal strength and TOA measurements and the raw measurements may be processed by the one or more processors 1402. Various antennas within the UE antenna array 1411 may be selected to be activated or deactivated.

The one or more processors 1402 may be implemented using a combination of hardware, firmware, and software. For example, the one or more processors 1402 may be configured to perform the functions discussed herein by implementing one or more instructions or program code 1408 on a non-transitory computer readable medium, such as medium 1420 and/or memory 1404. In some embodiments, the one or more processors 1402 may represent one or more circuits configurable to perform at least a portion of a data signal computing procedure or process related to the operation of UE 1400.

The medium 1420 and/or memory 1404 may store instructions or program code 1408 that contain executable code or software instructions that when executed by the one or more processors 1402 cause the one or more processors 1402 to operate as a special purpose computer programmed to perform the techniques disclosed herein. As illustrated in UE 1400, the medium 1420 and/or memory 1404 may include one or more components or modules that may be implemented by the one or more processors 1402 to perform the methodologies described herein. While the components or modules are illustrated as software in medium 1420 that is executable by the one or more processors 1402, it should be understood that the components or modules may be stored in memory 1404 or may be dedicated hardware either in the one or more processors 1402 or off the processors.

A number of software modules and data tables may reside in the medium 1420 and/or memory 1404 and be utilized by the one or more processors 1402 in order to manage both communications and the functionality described herein. It should be appreciated that the organization of the contents of the medium 1420 and/or memory 1404 as shown in UE 1400 is merely exemplary, and as such the functionality of the modules and/or data structures may be combined, separated, and/or be structured in different ways depending upon the implementation of the UE 1400.

The medium 1420 and/or memory 1404 may include a PRS configuration module 1422 that when implemented by the one or more processors 1402 configures the one or more processors 1402 to receive a PRS configuration for receiving DL PRS via the 1410, e.g., from a location server using LPP messaging. In some implementations, the PRS configuration module 1422 may configure the one or more processors 1402 to receive from the location server, via the transceiver 1410, a number of antennas to be used to receive DL PRS if the DL PRS includes a PRS resource or aggregate PRS spanning across multiple active bandwidth parts.

The medium 1420 and/or memory 1404 may include a max MIMO layer configuration module 1424 that when implemented by the one or more processors 1402 configures the one or more processors 1402 to receive a maximum DL MIMO layer configuration for communications via the transceiver 1410, e.g., from a serving base station using RRC messaging. For example, the max MIMO layer configuration may include an indication of a maximum number of DL MIMO layers that will be used to transmit control or data signals to the UE in each bandwidth part (BWP) in one or more bandwidth parts, wherein each bandwidth part comprises a set of frequency resources of a component carrier of a radio frequency (RF) spectrum band. In some implementations, the max MIMO layer configuration module 1424 may configure the one or more processors 1402 to receive from the serving base station, via the transceiver 1410, an indication of a cell specific maximum number of DL MIMO layers that will be used by the base station to transmit communication signals, e.g., control signals or data signals.

The medium 1420 and/or memory 1404 may include an SRS communication configuration module 1426 that when implemented by the one or more processors 1402 configures the one or more processors 1402 to receive an SRS configuration for communications via the transceiver 1410, e.g., from a serving base station using RRC messaging. For example, the UE 1400 may be configured with a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof. For example, the UE may be configured for communication based on a maximum number of UL Multiple-Input Multiple-Output (MIMO) layers for communication in each bandwidth part in one or more bandwidth parts, wherein each bandwidth part comprises a set of frequency resources of a component carrier of a radio frequency (RF) spectrum band.

The medium 1420 and/or memory 1404 may include an SRS positioning configuration module 1428 that when implemented by the one or more processors 1402 configures the one or more processors 1402 to receive an SRS configuration for positioning via the transceiver 1410, e.g., from a serving base station using RRC messaging. For example, the UE 1400 may be configured with the number N antenna ports within one SRS resource for positioning, or the number N of SRS resources for positioning with one antenna port each, e.g., based on the UL MIMO layers. For example, the UE may be configured with X ports within one SRS resource for positioning.

The medium 1420 and/or memory 1404 may include a PRS module 1430 that when implemented by the one or more processors 1402 configures the one or more processors 1402 to receive DL PRS from a base station, via the transceiver 1410 and antenna array 1411. The PRS module 1430 configures the one or more processors 1402 to use a number of antennas in the antenna array 1411 to receive the PRS that is based on, e.g., at least equal to, the maximum number of DL MIMO layers in the active bandwidth part as configured by the max MIMO layer configuration module 1424. If the UE 1400 is configured with measurement gaps, the PRS module 1430 may configure the one or more processors 1402 to use a number of antennas in the antenna array 1411 to receive the PRS that is based on, e.g., at least equal to the cell specific maximum number of DL MIMO layers, e.g., by the max MIMO layer configuration module 1424. If the DL PRS includes a PRS resource or aggregate PRS spanning across multiple active bandwidth parts, the PRS module 1430 may configure the one or more processors 1402 to use a number of antennas which is based on, e.g., at least equal to, a minimum number or a maximum number of antennas configured by the maximum number of DL MIMO layers in the multiple active bandwidth parts, e.g., as configured by the max MIMO layer configuration module 1424 or a number of antennas as configured by the location server by the PRS configuration module 1422. In another implementation, if the DL PRS includes a PRS resource or aggregate PRS spanning across multiple active bandwidth parts that have different maximum DL MIMO layer configurations, the PRS module 1430 may configure the one or more processors 1402 to not receive the DL PRS.

The medium 1420 and/or memory 1404 may include an SRS module 1432 that when implemented by the one or more processors 1402 configures the one or more processors 1402 to transmit SRS for positioning via the transceiver 1410 using at least the number N of antennas in the antenna array 1411.

The medium 1420 and/or memory 1404 may include an accuracy adjustment module 1434 that when implemented by the one or more processors 1402 configures the one or more processors 1402 to adjust the accuracy requirement for a PRS measurement based on the number of antennas being equal to the maximum number of DL MIMO layers in the active bandwidth part and used to receive the PRS.

The medium 1420 and/or memory 1404 may include a position measurement module 1436 that when implemented by the one or more processors 1402 configures the one or more processors 1402 to perform position measurements using the received DL PRS, such as TOA, RSTD, TDOA, RSRP, Rx–Tx, etc. In UE based positioning process, the position measurement module 1436 may further configure the one or more processors 1402 to determine an estimated position of the UE 1400 using the position measurements and known positions of the base stations, e.g., which may be received in an assistance data message.

The medium 1420 and/or memory 1404 may include a position measurement report module 1438 that when implemented by the one or more processors 1402 configures the one or more processors 1402 to report the position measurements to a location server, e.g., via the transceiver 1410. The position measurement report may include an indication number of antennas used to receive the DL PRS or the maximum number of DL MIMO layers. The number of antennas used to receive the DL PRS or the maximum number of DL MIMO layers reported to the location server may include a number of antennas or a maximum number of DL MIMO layers per PRS resource, per PRS resource set, per frequency layer, per transmission reception point (TRP), or a number of antennas used to measure all PRS resources used in generating the positioning measurement report.

The methodologies described herein may be implemented by various means depending upon the application. For example, these methodologies may be implemented in hardware, firmware, software, or any combination thereof. For a hardware implementation, the one or more processors 1402 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1420 or memory 1404 that is connected to and executed by the one or more processors 1402. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1408 on a non-transitory computer readable medium, such as medium 1420 and/or memory 1404. Examples include computer readable media encoded with a data structure and computer readable media encoded with a computer program 1408. For example, the non-transitory computer readable medium including program code 1408 stored thereon may include program code 1408 to support OTDOA measurements in a manner consistent with disclosed embodiments. Non-transitory computer readable medium 1420 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1408 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1420, instructions and/or data may be provided as signals on transmission media included in a communication apparatus. For example, a communication apparatus may include a transceiver 1410 having signals indicative of instructions and data. The instructions and data are configured to cause one or more processors to implement the functions outlined in the claims. That is, the communication apparatus includes transmission media with signals indicative of information to perform disclosed functions.

Memory 1404 may represent any data storage mechanism. Memory 1404 may include, for example, a primary memory and/or a secondary memory. Primary memory may include, for example, a random access memory, read only memory, etc. While illustrated in this example as being separate from one or more processors 1402, it should be understood that all or part of a primary memory may be provided within or otherwise co-located/coupled with the one or more processors 1402. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1420. As such, in certain example implementations, the methods and/or apparatuses presented herein may take the form in whole or part of a computer readable medium 1420 that may include computer implementable code 1408 stored thereon, which if executed by one or more processors 1402 may be operatively enabled to perform all or portions of the example operations as described herein. Computer readable medium 1420 may be a part of memory 1404.

A user equipment (UE) configured for positioning includes a means for receiving a positioning reference signal (PRS) configuration for receiving PRS, which may be, e.g., the wireless transceiver 1410 and one or more processors 1402 with dedicated hardware or implementing executable code or software instructions in memory 1420 such as the PRS configuration module 1422. A means for receiving an indication of a maximum number of downlink (DL) Multiple-Input Multiple-Output (MIMO) layers that will be used to transmit communication signals comprising control signals or data signals to the UE in each bandwidth part (BWP) in one or more bandwidth parts, wherein each bandwidth part comprises a set of frequency resources of a component carrier of a radio frequency (RF) spectrum band may be, e.g., the wireless transceiver 1410 and one or more processors 1402 with dedicated hardware or implementing executable code or software instructions in memory 1420 such as the max MIMO layer configuration module 1424. A means for receiving a PRS in an active bandwidth part using a number of antennas at least equal to the maximum number of DL MIMO layers in the active bandwidth part may be, e.g., the wireless transceiver 1410 and one or more processors 1402 with dedicated hardware or implementing executable code or software instructions in memory 1420 such as the PRS module 1430.

In one implementation, the UE may include a means for adjusting accuracy requirement for a PRS measurement based on the number of antennas used to receive the PRS being at least equal to the maximum number of DL MIMO layers in the active bandwidth part, which may be, e.g., the one or more processors 1402 with dedicated hardware or implementing executable code or software instructions in memory 1420 such as the accuracy adjust module 1434.

In one implementation, wherein no measurement gaps are configured for the PRS received in the active bandwidth part; and wherein when measurement gaps are configured for receiving a second PRS, the UE includes a means for receiving an indication of a cell specific maximum number of DL MIMO layers that will be used by a base station to transmit the communication signals to the UE which may be, e.g., the wireless transceiver 1410 and one or more processors 1402 with dedicated hardware or implementing executable code or software instructions in memory 1420 such as the max MIMO layer configuration module 1424. A means for receiving the second PRS using a second number of antennas at least equal to the cell specific maximum number of DL MIMO layers, which may be, e.g., the wireless transceiver 1410 and one or more processors 1402 with dedicated hardware or implementing executable code or software instructions in memory 1420 such as the PRS module 1430.

In one implementation, the UE may include a means for transmitting a report to the location server with the number of antennas used to receive the PRS or the maximum number of DL MIMO layers configured to the UE, which may be, e.g., the wireless transceiver 1410 and one or more processors 1402 with dedicated hardware or implementing executable code or software instructions in memory 1420 such as the position measurement report module 1438.

A user equipment (UE) configured for positioning includes a means for receiving a first configuration from a serving base station with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof, which may be, e.g., the wireless transceiver 1410 and one or more processors 1402 with dedicated hardware or implementing executable code or software instructions in memory 1420 such as the SRS communication configuration module 1426. A means for receiving a second configuration from the serving base station with the number N antenna ports within one SRS resource for positioning, or the number N of SRS resources for positioning with one antenna port each may be, e.g., the wireless transceiver 1410 and one or more processors 1402 with dedicated hardware or implementing executable code or software instructions in memory 1420 such as the SRS positioning configuration module 1428. A means for transmitting SRS for positioning with at least the number N of antennas may be, e.g., the wireless transceiver 1410 and one or more processors 1402 with dedicated hardware or implementing executable code or software instructions in memory 1420 such as the SRS module 1432.

Figure 15:
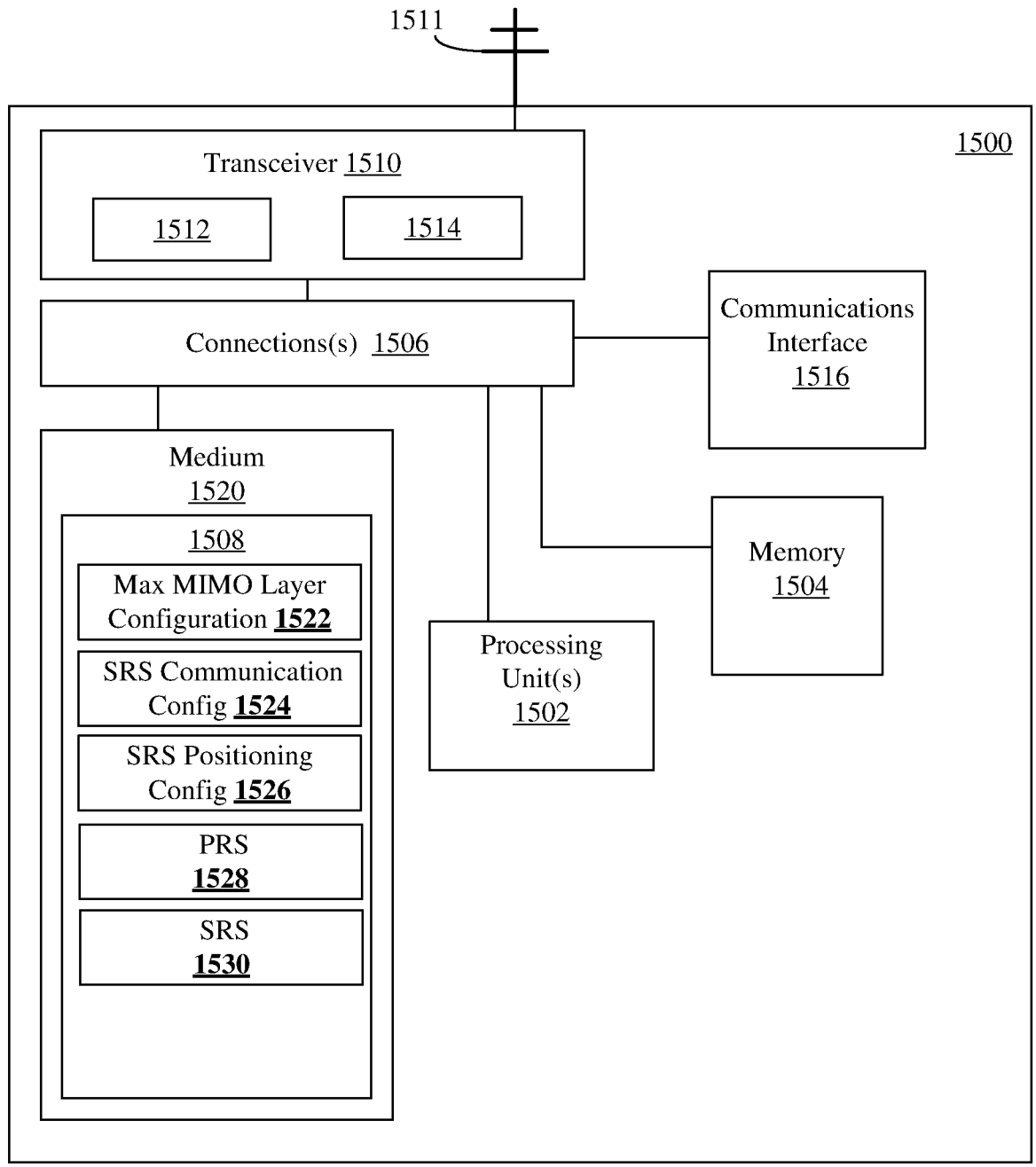
FIG. 15 shows a schematic block diagram illustrating certain exemplary features of a base station enabled to support positioning of the UE using transmission of SRS for positioning based on the configuration for SRS for communications.

FIG. 15 shows a schematic block diagram illustrating certain exemplary features of a base station, e.g., base station 102 shown in FIG. 1, enabled to support positioning of the UE using transmission of SRS for positioning based on the configuration for SRS for communications, as described herein. Base station 102 may, for example, include one or more processors 1502, memory 1504, an external interface, which may include a transceiver 1510 (e.g., wireless network interface) and a communications interface 1516 (e.g., wireline or wireless network interface to other base stations and/or the core network), which may be operatively coupled with one or more connections 1506 (e.g., buses, lines, fibers, links, etc.) to non-transitory computer readable medium 1520 and memory 1504. The base station 102 may further include additional items, which are not shown, such as a user interface that may include e.g., a display, a keypad or other input device, such as virtual keypad on the display, through which a user may interface with the UE, or a satellite positioning system receiver. In certain example implementations, all or part of base station 102 may take the form of a chipset, and/or the like. Transceiver 1510 may, for example, include a transmitter 1512 enabled to transmit one or more signals over one or more types of wireless communication networks and a receiver 1514 to receive one or more signals transmitted over the one or more types of wireless communication networks. The communications interface 1516 may be a wired or wireless interface capable of connecting to other base stations in the RAN or network entities, such as a location server 172 shown in FIG. 1.

In some embodiments, base station 102 may include an antenna array 1511, which may be internal or external. Antenna array 1511 may be used to transmit and/or receive signals processed by transceiver 1510. In some embodiments, antenna array 1511 may be coupled to transceiver 1510. In some embodiments, measurements of signals received (transmitted) by base station 102 may be performed at the point of connection of the antenna array 1511 and transceiver 1510. For example, the measurement point of reference for received (transmitted) RF signal measurements may be an input (output) terminal of the receiver 1514 (transmitter 1512) and an output (input) terminal of the antenna array 1511. With the antenna array 1511, the antenna connector may be viewed as a virtual point representing the aggregate output (input) of multiple antennas. In some embodiments, base station 102 may measure received signals including signal strength and TOA measurements and the raw measurements may be processed by the one or more processors 1502.

The one or more processors 1502 may be implemented using a combination of hardware, firmware, and software. For example, the one or more processors 1502 may be configured to perform the functions discussed herein by implementing one or more instructions or program code 1508 on a non-transitory computer readable medium, such as medium 1520 and/or memory 1504. In some embodiments, the one or more processors 1502 may represent one or more circuits configurable to perform at least a portion of a data signal computing procedure or process related to the operation of base station 102.

The medium 1520 and/or memory 1504 may store instructions or program code 1508 that contain executable code or software instructions that when executed by the one or more processors 1502 cause the one or more processors 1502 to operate as a special purpose computer programmed to perform the techniques disclosed herein. As illustrated in base station 102, the medium 1520 and/or memory 1504 may include one or more components or modules that may be implemented by the one or more processors 1502 to perform the methodologies described herein. While the components or modules are illustrated as software in medium 1520 that is executable by the one or more processors 1502, it should be understood that the components or modules may be stored in memory 1504 or may be dedicated hardware either in the one or more processors 1502 or off the processors.

A number of software modules and data tables may reside in the medium 1520 and/or memory 1504 and be utilized by the one or more processors 1502 in order to manage both communications and the functionality described herein. It should be appreciated that the organization of the contents of the medium 1520 and/or memory 1504 as shown in base station 102 is merely exemplary, and as such the functionality of the modules and/or data structures may be combined, separated, and/or be structured in different ways depending upon the implementation of the base station 102.

The medium 1520 and/or memory 1504 may include a max MIMO layer configuration module 1522 that when implemented by the one or more processors 1502 configures the one or more processors 1502 to transmit a maximum DL MIMO layer configuration for communications via the transceiver 1510, e.g., to a UE using RRC messaging. For example, the max MIMO layer configuration may include an indication of a maximum number of DL MIMO layers that will be used to transmit control or data signals to the UE in each bandwidth part (BWP) in one or more bandwidth parts, wherein each bandwidth part comprises a set of frequency resources of a component carrier of a radio frequency (RF) spectrum band. In some implementations, the max MIMO layer configuration module 1522 may configure the one or more processors 1502 to transmit to the UE, via the transceiver 1510, an indication of a cell specific maximum number of DL MIMO layers that will be used by the base station to transmit communication signals, e.g., control signals or data signals.

The medium 1520 and/or memory 1504 may include an SRS communication configuration module 1524 that when implemented by the one or more processors 1502 configures the one or more processors 1502 to transmit an SRS configuration for communications via the transceiver 1510, e.g., to a UE using RRC messaging. For example, the base station 1500 may configure the UE with a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof. For example, the base station 1500 may configure the UE for communication based on a maximum number of UL Multiple-Input Multiple-Output (MIMO) layers for communication in each bandwidth part in one or more bandwidth parts, wherein each bandwidth part comprises a set of frequency resources of a component carrier of a radio frequency (RF) spectrum band.

The medium 1520 and/or memory 1504 may include an SRS positioning configuration module 1526 that when implemented by the one or more processors 1502 configures the one or more processors 1502 to transmit an SRS configuration for positioning via the transceiver 1510, e.g., to the UE using RRC messaging. For example, the base station 1500 may configure the UE with the number N antenna ports within one SRS resource for positioning, or the number N of SRS resources for positioning with one antenna port each, e.g., based on the UL MIMO layers. For example, the base station 1500 may configure the UE with X ports within one SRS resource for positioning.

The medium 1520 and/or memory 1504 may include a PRS module 1528 that when implemented by the one or more processors 1502 configures the one or more processors 1502 to transmit DL PRS, via the transceiver 1510 and antenna array 1511.

The medium 1520 and/or memory 1504 may include an SRS module 1530 that when implemented by the one or more processors 1502 configures the one or more processors 1502 to receive SRS for positioning via the transceiver 1510.

The methodologies described herein may be implemented by various means depending upon the application. For example, these methodologies may be implemented in hardware, firmware, software, or any combination thereof. For a hardware implementation, the one or more processors 1502 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1520 or memory 1504 that is connected to and executed by the one or more processors 1502. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1508 on a non-transitory computer readable medium, such as medium 1520 and/or memory 1504. Examples include computer readable media encoded with a data structure and computer readable media encoded with a computer program 1508. For example, the non-transitory computer readable medium including program code 1508 stored thereon may include program code 1508 to support OTDOA measurements in a manner consistent with disclosed embodiments. Non-transitory computer readable medium 1520 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1508 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1520, instructions and/or data may be provided as signals on transmission media included in a communication apparatus. For example, a communication apparatus may include a transceiver 1510 having signals indicative of instructions and data. The instructions and data are configured to cause one or more processors to implement the functions outlined in the claims. That is, the communication apparatus includes transmission media with signals indicative of information to perform disclosed functions.

Memory 1504 may represent any data storage mechanism. Memory 1504 may include, for example, a primary memory and/or a secondary memory. Primary memory may include, for example, a random access memory, read only memory, etc. While illustrated in this example as being separate from one or more processors 1502, it should be understood that all or part of a primary memory may be provided within or otherwise co-located/coupled with the one or more processors 1502. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1520. As such, in certain example implementations, the methods and/or apparatuses presented herein may take the form in whole or part of a computer readable medium 1520 that may include computer implementable code 1508 stored thereon, which if executed by one or more processors 1502 may be operatively enabled to perform all or portions of the example operations as described herein. Computer readable medium 1520 may be a part of memory 1504.

A base station may include a means for configuring the UE with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof, may be, e.g., the wireless transceiver 1510 and one or more processors 1502 with dedicated hardware or implementing executable code or software instructions in memory 1520 such as the SRS communication configuration module 1524. A means for configuring the UE with the number N antenna ports within one SRS resource for positioning, or the number N of SRS resources for positioning with one antenna port each may be, e.g., the wireless transceiver 1510 and one or more processors 1502 with dedicated hardware or implementing executable code or software instructions in memory 1520 such as the SRS positioning configuration module 1526.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

In one implementation (1) a method for positioning of a user equipment (UE) performed by a serving base station for the UE, comprising: configuring the UE with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof; and configuring the UE with the number N antenna ports within one SRS resource for positioning, or the number N of SRS resources for positioning with one antenna port each.

There may be some implementations (2) of the above-described method (1) wherein the UE is configured for communication based on a maximum number of UL Multiple-Input Multiple-Output (MIMO) layers for communication in each bandwidth part in one or more bandwidth parts, wherein each bandwidth part comprises a set of frequency resources of a component carrier of a radio frequency (RF) spectrum band, and the UE is configured with the number N antenna ports within one SRS resource for positioning, or the number N of SRS resources for positioning based on the UL MIMO layers.

There may be some implementations (3) of the above-described method (1) wherein the UE is configured with X antenna ports within one SRS resource for positioning, and the UE transmits the SRS resource with N antenna ports, wherein N is less than X.

In one implementation (4) a base station serving a user equipment (UE) configured for positioning, comprising: a wireless transceiver for wirelessly receiving and sending messages with UEs; a communication interface for receiving and sending messages to entities within a wireless network; at least one memory; and at least one processor coupled to the wireless transceiver, the communication interface, and the at least one memory, the at least one processor configured to: configuring the UE with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof; and configuring the UE with the number N antenna ports within one SRS resource for positioning, or the number N of SRS resources for positioning with one antenna port each.

There may be some implementations (5) of the above-described base station (4) wherein the UE is configured for communication based on a maximum number of UL Multiple-Input Multiple-Output (MIMO) layers for communication in each bandwidth part in one or more bandwidth parts, wherein each bandwidth part comprises a set of frequency resources of a component carrier of a radio frequency (RF) spectrum band, and the UE is configured with the number N antenna ports within one SRS resource for positioning, or the number N of SRS resources for positioning for positioning based on the UL MIMO layers.

There may be some implementations (6) of the above-described base station (4) wherein the UE is configured with X antenna ports within one SRS resource for positioning, and the UE transmits the SRS resource with N antenna ports, wherein N is less than X.

In one implementation (7) a base station serving a user equipment (UE) configured for positioning, comprising: means for configuring the UE with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof; and means for configuring the UE with the number N antenna ports within one SRS resource for positioning, or the number N of SRS resources for positioning with one antenna port each.

There may be some implementations (8) of the above-described base station (7) wherein the UE is configured for communication based on a maximum number of UL Multiple-Input Multiple-Output (MIMO) layers for communication in each bandwidth part in one or more bandwidth parts, wherein each bandwidth part comprises a set of frequency resources of a component carrier of a radio frequency (RF) spectrum band, and the UE is configured with the number N antenna ports within one SRS resource for positioning, or the number N of SRS resources for positioning based on the UL MIMO layers.

There may be some implementations (9) of the above-described base station (7) wherein the UE is configured with X antenna ports within one SRS resource for positioning, and the UE transmits the SRS resource with N antenna ports, wherein N is less than X.

In one implementation (10) a non-transitory computer readable storage medium including program code stored thereon, the program code is operable to configure at least one processor in a base station serving a user equipment (UE) configured for positioning, comprising: program code to configure the UE with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof; and program code to configure the UE with the number N antenna ports within one SRS resource for positioning, or the number N of SRS resources for positioning with one antenna port each.

There may be some implementations (11) a method for positioning of a user equipment (UE) performed by the UE, comprising: receiving a first configuration from a serving base station with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof; receiving a second configuration from the serving base station with the number N antenna ports within one SRS resource for positioning, or the number N of SRS resources for positioning with one antenna port each; and transmitting SRS for positioning with at least the number N of antennas.

There may be some implementations (12) of the above-described method (11) wherein the UE is configured for communication based on a maximum number of UL Multiple-Input Multiple-Output (MIMO) layers for communication in each bandwidth part in one or more bandwidth parts, wherein each bandwidth part comprises a set of frequency resources of a component carrier of a radio frequency (RF) spectrum band, and the UE is configured with the number N antenna ports within one SRS resource for positioning, or the number N of SRS resources for positioning based on the UL MIMO layers.

There may be some implementations (13) of the above-described method (11) wherein the UE is configured with X antenna ports within one SRS resource for positioning, and the UE transmits the SRS resource with N antenna ports, wherein N is less than X.

In one implementation (14) a user equipment (UE) configured for positioning, comprising: a wireless transceiver configured for sending and receiving messages; at least one memory; and at least one processor coupled to the wireless transceiver and the at least one memory, the at least one processor configured to: receive a first configuration from a serving base station with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof; receive a second configuration from the serving base station with the number N antenna ports within one SRS resource for positioning, or the number N of SRS resources for positioning with one antenna port each; and transmit SRS for positioning with at least the number N of antennas.

There may be some implementations (15) of the above-described UE (14) wherein the UE is configured for communication based on a maximum number of UL Multiple-Input Multiple-Output (MIMO) layers for communication in each bandwidth part in one or more bandwidth parts, wherein each bandwidth part comprises a set of frequency resources of a component carrier of a radio frequency (RF) spectrum band, and the UE is configured with the number N antenna ports within one SRS resource for positioning, or the number N of SRS resources for positioning for positioning based on the UL MIMO layers.

There may be some implementations (16) of the above-described UE (14) wherein the UE is configured with X antenna ports within one SRS resource for positioning, and the UE transmits the SRS resource with N antenna ports, wherein N is less than X.

In one implementation (17) a user equipment (UE) configured for positioning, comprising: means for receiving a first configuration from a serving base station with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof; means for receiving a second configuration from the serving base station with the number N antenna ports within one SRS resource for positioning, or the number N of SRS resources for positioning with one antenna port each; and means for transmitting SRS for positioning with at least the number N of antennas.

There may be some implementations (18) of the above-described UE (17) wherein the UE is configured for communication based on a maximum number of UL Multiple-Input Multiple-Output (MIMO) layers for communication in each bandwidth part in one or more bandwidth parts, wherein each bandwidth part comprises a set of frequency resources of a component carrier of a radio frequency (RF) spectrum band, and the UE is configured with the number N antenna ports within one SRS resource for positioning, or the number N of SRS resources for positioning based on the UL MIMO layers.

There may be some implementations (19) of the above-described UE (17) wherein the UE is configured with X antenna ports within one SRS resource for positioning, and the UE transmits the SRS resource with N antenna ports, wherein N is less than X.

In one implementation (20) a non-transitory computer readable storage medium including program code stored thereon, the program code is operable to configure at least one processor in a base station serving a user equipment (UE) configured for positioning, comprising: program code to receive a first configuration from a serving base station with: a number N of sounding reference signal (SRS) resources for uplink (UL) communication, each SRS resource comprising one antenna port; or SRS resources for UL communication with up to the number N of antenna ports in each SRS resource; or an SRS for downlink (DL) channel state information (CSI) acquisition with an SRS antenna port switching pattern, wherein the SRS antenna port switching pattern corresponds to SRS transmissions on N antenna ports over a total of y antennas, where y corresponds to all or subset of UE receive antennas; or a combination thereof; program code to receive a second configuration from the serving base station with the number N antenna ports within one SRS resource for positioning, or the number N of SRS resources for positioning with one antenna port each; and program code to transmit SRS for positioning with at least the number N of antennas.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for positioning of a user equipment (UE) performed by the UE, comprising:
   receiving a positioning reference signal (PRS) configuration for receiving PRS in a positioning occasion, wherein the PRS comprise positioning-specific reference signals;
   receiving an indication of a maximum number of downlink (DL) Multiple-Input Multiple-Output (MIMO) layers that will be used to transmit communication signals comprising control signals or data signals to the UE in each bandwidth part (BWP) in one or more bandwidth parts, wherein each bandwidth part comprises a set of frequency resources of a component carrier of a radio frequency (RF) spectrum band;
   receiving the PRS in the positioning occasion in an active bandwidth part using a number of antennas based on the maximum number of DL MIMO layers in the active bandwidth part; and
   performing position measurements using the PRS in the positioning occasion received using the number of antennas.

2. The method of claim 1, wherein the number of antennas based on the maximum number of DL MIMO layers in the active bandwidth part comprises the number of antennas at least equal to the maximum number of DL MIMO layers in the active bandwidth part.

3. The method of claim 1, further comprising adjusting accuracy requirement for a PRS measurement based on the number of antennas used to receive the PRS based on the maximum number of DL MIMO layers in the active bandwidth part.

4. The method of claim 1, wherein no measurement gaps are configured for the PRS received in the active bandwidth part; and wherein when measurement gaps are configured for receiving a second PRS, the method further comprises:
   receiving an indication of a cell specific maximum number of DL MIMO layers that will be used by a base station to transmit the communication signals to the UE;
   receiving the second PRS using a second number of antennas based on the cell specific maximum number of DL MIMO layers.

5. The method of claim 1, wherein the PRS comprises a PRS resource or an aggregate PRS spanning across multiple active bandwidth parts, and receiving the PRS in the active bandwidth part using the number of antennas based on the maximum number of DL MIMO layers in the active bandwidth part comprises receiving the PRS resource or the aggregate PRS spanning across multiple active bandwidth parts using the number of antennas which is based on one of a minimum or a maximum number of antennas configured by the maximum number of DL MIMO layers in the multiple active bandwidth parts or using the number of antennas configured by a location server.

6. The method of claim 5, wherein the aggregate PRS spanning across multiple active bandwidth parts comprises a collection of PRS resources or sets of PRS resources that the UE is expected to process jointly.

7. The method of claim 5, wherein each active bandwidth part is in a different component carrier of the RF spectrum band.

8. The method of claim 1, wherein the PRS comprises a PRS resource or an aggregate PRS spanning across multiple active bandwidth parts, wherein each of the multiple active bandwidth parts has a same maximum number of DL MIMO layers, wherein the PRS resource or the aggregate PRS spanning across multiple active bandwidth parts having different maximum number of DL MIMO layers is not received.

9. The method of claim 1, wherein the PRS configuration is received from a location server and the indication of the maximum number of DL MIMO layers is received from a serving base station.

10. The method of claim 9, wherein the serving base station reports to the location server the indication of the maximum number of DL MIMO layers of the UE.

11. The method of claim 9, further comprising transmitting a report to the location server with the number of antennas used to receive the PRS or the maximum number of DL MIMO layers configured to the UE.

12. The method of claim 11, wherein the report of the number of antennas used to receive the PRS or the maximum number of DL MIMO layers configured to the UE is included in a positioning measurement report transmitted to the location server.

13. The method of claim 12, wherein the number of antennas used to receive the PRS or the maximum number of DL MIMO layers reported to the location server comprises one of the number of antennas or the maximum number of DL MIMO layers per PRS resource, per PRS resource set, per frequency layer, per transmission reception point (TRP), or the number of antennas used to measure all PRS resources used in generating the positioning measurement report.

14. A user equipment (UE) configured for positioning, comprising:
a wireless transceiver configured for sending and receiving messages;
at least one memory; and
at least one processor coupled to the wireless transceiver and the at least one memory, the at least one processor configured to:
receive, via the wireless transceiver, a positioning reference signal (PRS) configuration for receiving PRS in a positioning occasion, wherein the PRS comprise positioning-specific reference signals;
receive, via the wireless transceiver, an indication of a maximum number of downlink (DL) Multiple-Input Multiple-Output (MIMO) layers that will be used to transmit communication signals comprising control signals or data signals to the UE in each bandwidth part (BWP) in one or more bandwidth parts, wherein each bandwidth part comprises a set of frequency resources of a component carrier of a radio frequency (RF) spectrum band;
receive, via the wireless transceiver, the PRS in the positioning occasion in an active bandwidth part using a number of antennas based on the maximum number of DL MIMO layers in the active bandwidth part; and
perform position measurements using the PRS in the positioning occasion received using the number of antennas.

15. The UE of claim 14, wherein the number of antennas based on the maximum number of DL MIMO layers in the active bandwidth part comprises the number of antennas at least equal to the maximum number of DL MIMO layers in the active bandwidth part.

16. The UE of claim 14, wherein the at least one processor is further configured to adjust accuracy requirement for a PRS measurement based on the number of antennas used to receive the PRS based on the maximum number of DL MIMO layers in the active bandwidth part.

17. The UE of claim 14, wherein no measurement gaps are configured for the PRS received in the active bandwidth part; and wherein when measurement gaps are configured for receiving a second PRS, the at least one processor is configured to:
receive, via the wireless transceiver, an indication of a cell specific maximum number of DL MIMO layers that will be used by a base station to transmit the communication signals to the UE;
receive, via the wireless transceiver, the second PRS using a second number of antennas based on the cell specific maximum number of DL MIMO layers.

18. The UE of claim 14, wherein the PRS comprises a PRS resource or an aggregate PRS spanning across multiple active bandwidth parts, and the at least one processor is configured to receive the PRS in the active bandwidth part using the number of antennas based on the maximum number of DL MIMO layers in the active bandwidth part by being configured to receive the PRS resource or the aggregate PRS spanning across multiple active bandwidth parts using the number of antennas which is based on one of a minimum or a maximum number of antennas configured by the maximum number of DL MIMO layers in the multiple active bandwidth parts or using the number of antennas configured by a location server.

19. The UE of claim 18, wherein the aggregate PRS spanning across multiple active bandwidth parts comprises a collection of PRS resources or sets of PRS resources that the UE is expected to process jointly.

20. The UE of claim 18, wherein each active bandwidth part is in a different component carrier of the RF spectrum band.

21. The UE of claim 14, wherein the PRS comprises a PRS resource or an aggregate PRS spanning across multiple active bandwidth parts, wherein each of the multiple active bandwidth parts has a same maximum number of DL MIMO layers, wherein the PRS resource or the aggregate PRS spanning across multiple active bandwidth parts having different maximum number of DL MIMO layers is not received.

22. The UE of claim 14, wherein the PRS configuration is received from a location server and the indication of the maximum number of DL MIMO layers is received from a serving base station.

23. The UE of claim 22, wherein the serving base station reports to the location server the indication of the maximum number of DL MIMO layers of the UE.

24. The UE of claim 22, wherein the at least one processor is further configured to transmit a report to the location server with the number of antennas used to receive the PRS or the maximum number of DL MIMO layers configured to the UE.

25. The UE of claim 24, wherein the report of the number of antennas used to receive the PRS or the maximum number of DL MIMO layers configured to the UE is included in a positioning measurement report transmitted to the location server.

26. The UE of claim 25, wherein the number of antennas used to receive the PRS or the maximum number of DL MIMO layers reported to the location server comprises one of the number of antennas or a maximum number of DL MIMO layers per PRS resource, per PRS resource set, per frequency layer, per transmission reception point (TRP), or the number of antennas used to measure all PRS resources used in generating the positioning measurement report.

27. A user equipment (UE) configured for positioning, comprising:
   means for receiving a positioning reference signal (PRS) configuration for receiving PRS in a positioning occasion, wherein the PRS comprise positioning-specific reference signals;
   means for receiving an indication of a maximum number of downlink (DL) Multiple-Input Multiple-Output (MIMO) layers that will be used to transmit communication signals comprising control signals or data signals to the UE in each bandwidth part (BWP) in one or more bandwidth parts, wherein each bandwidth part comprises a set of frequency resources of a component carrier of a radio frequency (RF) spectrum band;
   means for receiving the PRS in the positioning occasion in an active bandwidth part using a number of antennas based on the maximum number of DL MIMO layers in the active bandwidth part; and
   means for performing position measurements using the PRS in the positioning occasion received using the number of antennas.

28. The UE of claim 27, wherein the number of antennas based on the maximum number of DL MIMO layers in the active bandwidth part comprises the number of antennas at least equal to the maximum number of DL MIMO layers in the active bandwidth part.

29. The UE of claim 27, wherein no measurement gaps are configured for the PRS received in the active bandwidth part; and wherein when measurement gaps are configured for receiving a second PRS, the UE further comprises:
   means for receiving an indication of a cell specific maximum number of DL MIMO layers that will be used by a base station to transmit the communication signals to the UE;
   means for receiving the second PRS using a second number of antennas based on the cell specific maximum number of DL MIMO layers.

30. The UE of claim 27, wherein the PRS comprises a PRS resource or an aggregate PRS spanning across multiple active bandwidth parts, and receiving the PRS in the active bandwidth part using the number of antennas based on the maximum number of DL MIMO layers in the active bandwidth part comprises receiving the PRS resource or the aggregate PRS spanning across multiple active bandwidth parts using the number of antennas which is based on one of a minimum or a maximum number of antennas configured by the maximum number of DL MIMO layers in the multiple active bandwidth parts or using the number of antennas configured by a location server.

31. The UE of claim 30, wherein the aggregate PRS spanning across multiple active bandwidth parts comprises a collection of PRS resources or sets of PRS resources that the UE is expected to process jointly.

32. The UE of claim 30, wherein each active bandwidth part is in a different component carrier of the RF spectrum band.

33. The UE of claim 27, wherein the PRS comprises a PRS resource or an aggregate PRS spanning across multiple active bandwidth parts, wherein each of the multiple active bandwidth parts has a same maximum number of DL MIMO layers, wherein the PRS resource or the aggregate PRS spanning across multiple active bandwidth parts having different maximum number of DL MIMO layers is not received.

34. The UE of claim 27, wherein the PRS configuration is received from a location server and the indication of the maximum number of DL MIMO layers is received from a serving base station.

35. The UE of claim 34, wherein the serving base station reports to the location server the indication of the maximum number of DL MIMO layers of the UE.

36. The UE of claim 34, further comprising means for transmitting a report to the location server with the number of antennas used to receive the PRS or the maximum number of DL MIMO layers configured to the UE.

37. The UE of claim 36, wherein the report of the number of antennas used to receive the PRS or the maximum number of DL MIMO layers configured to the UE is included in a positioning measurement report transmitted to the location server.

38. The UE of claim 37, wherein the number of antennas used to receive the PRS or the maximum number of DL MIMO layers reported to the location server comprises one of the number of antennas or the maximum number of DL MIMO layers per PRS resource, per PRS resource set, per frequency layer, per transmission reception point (TRP), or the number of antennas used to measure all PRS resources used in generating the positioning measurement report.

39. A non-transitory computer readable storage medium including program code stored thereon, the program code is operable to configure at least one processor in a user equipment (UE) configured for positioning, comprising:
   program code to receive a positioning reference signal (PRS) configuration for receiving PRS in a positioning occasion, wherein the PRS comprise positioning-specific reference signals;
   program code to receive an indication of a maximum number of downlink (DL) Multiple-Input Multiple-Output (MIMO) layers that will be used to transmit communication signals comprising control signals or data signals to the UE in each bandwidth part (BWP) in one or more bandwidth parts, wherein each bandwidth part comprises a set of frequency resources of a component carrier of a radio frequency (RF) spectrum band;
   program code to receive the PRS in the positioning occasion in an active bandwidth part using a number of antennas based on the maximum number of DL MIMO layers in the active bandwidth part; and
   perform position measurements using the PRS in the positioning occasion received using the number of antennas.

* * * * *